United States Patent
Leuschner et al.

(10) Patent No.: US 10,017,639 B2
(45) Date of Patent: Jul. 10, 2018

(54) POLYESTER-ETHER RESIN BLENDS

(71) Applicant: INVISTA NORTH AMERICA S.A.R.L., Wilmington, DE (US)

(72) Inventors: Eva-Marie Leuschner, Augsburg (DE); Josef Wiedemann, Zusmarshausen (DE); Uwe Bayer, Gessertshausen (DE); Stephan Kretschmer, Stadtbergen (DE); Karsten Fritsch, Schwabmunchen (DE)

(73) Assignee: INVISTA NORTH AMERICA S.A.R.L., Wilmington, DE (US)

( * ) Notice: Subject to any disclaimer, the term of this patent is extended or adjusted under 35 U.S.C. 154(b) by 68 days.

(21) Appl. No.: 15/104,260

(22) PCT Filed: Dec. 19, 2014

(86) PCT No.: PCT/US2014/071643
§ 371 (c)(1),
(2) Date: Jun. 14, 2016

(87) PCT Pub. No.: WO2015/095782
PCT Pub. Date: Jun. 25, 2015

(65) Prior Publication Data
US 2016/0333179 A1    Nov. 17, 2016

Related U.S. Application Data

(60) Provisional application No. 62/069,236, filed on Oct. 27, 2014, provisional application No. 62/069,239, (Continued)

(30) Foreign Application Priority Data

Dec. 20, 2013  (EP) .................................... 13199102
Dec. 20, 2013  (EP) .................................... 13199112

(Continued)

(51) Int. Cl.
*C08L 67/02* (2006.01)
*C08K 5/3435* (2006.01)
(Continued)

(52) U.S. Cl.
CPC ................. *C08L 67/02* (2013.01); *C08J 3/22* (2013.01); *C08K 5/3435* (2013.01);
(Continued)

(58) Field of Classification Search
CPC ...................................................... C08L 67/02
See application file for complete search history.

(56) References Cited

U.S. PATENT DOCUMENTS 6,455,620 B1 *  9/2002  Cyr .................. C08K 5/098
                                                    524/376
6,534,585 B1 *  3/2003  Dijkstra ................ C08K 3/04
                                                    427/372.2
(Continued)

FOREIGN PATENT DOCUMENTS

WO   1999/062997 A1   12/1999
WO   2001/010947 A1    2/2001
(Continued)

OTHER PUBLICATIONS

"National Occupational Health And Safety Commission Australia:Full Public Report Cyasorb UV-3529", National Industrial Chemicals Notification and Assessment Scheme, Australia, Online available : URL:http://www.nicnas.gov.au/_data/assets /pdf-_file/0006/9456/NA686FR.PDF, Jun. 1999, 36 pages.
(Continued)

*Primary Examiner* — Arrie L Reuther
(74) *Attorney, Agent, or Firm* — Robert B. Furr, Jr.

(57) ABSTRACT

The present application relates to novel polyester-ether compositions and their use as oxygen scavenging materials in polyester resins.

13 Claims, 1 Drawing Sheet

1: Sample 5
2: Sample 6
3: Sample 7

Related U.S. Application Data filed on Oct. 27, 2014, provisional application No. 62/069,252, filed on Oct. 27, 2014, provisional application No. 62/069,258, filed on Oct. 27, 2014.

(30) Foreign Application Priority Data

Dec. 20, 2013 (EP) .................................... 13199125
Dec. 20, 2013 (EP) .................................... 13199131

(51) Int. Cl.
*C08J 3/22* (2006.01)
*C08K 5/098* (2006.01)

(52) U.S. Cl.
CPC ......... *C08L 67/025* (2013.01); *C08J 2367/02* (2013.01); *C08J 2467/02* (2013.01); *C08K 5/098* (2013.01)

(56) References Cited

U.S. PATENT DOCUMENTS

2005/0124779 A1 6/2005 Shelby et al.
2006/0058435 A1 3/2006 Szekely

FOREIGN PATENT DOCUMENTS

| WO | 2009/032560 A1 | 3/2009 |
| WO | 2010/096459 A2 | 8/2010 |
| WO | 2011/031929 A2 | 3/2011 |
| WO | 2012/126951 A1 | 9/2012 |
| WO | 2015/095782 A2 | 6/2015 |

OTHER PUBLICATIONS

"Patricia Schrijver-Rzymelka: Lichtschutzmittel, Kunststoffe", XP055175229 Munchen, Online Available : URL:https://www.kunststoffe.de/_storage/asset/525035/storage/master/file/I0398439/download/Lichtschutzmittel.pdf p. 89-p. 89; examples HALS-2 Cyasorb UV-3529; table Table, Issue 7, Jan. 1, 1999, pp. 87-90.

International Search Report and Written Opinion Received for PCT Application No. PCT/US2014/071643, dated Jul. 14, 2015, 18 pages.

International Preliminary Report and Patentability Report Received for PCT Patent Application No. PCT/US2014/071643, dated Jun. 30, 2016, 13 pages.

\* cited by examiner

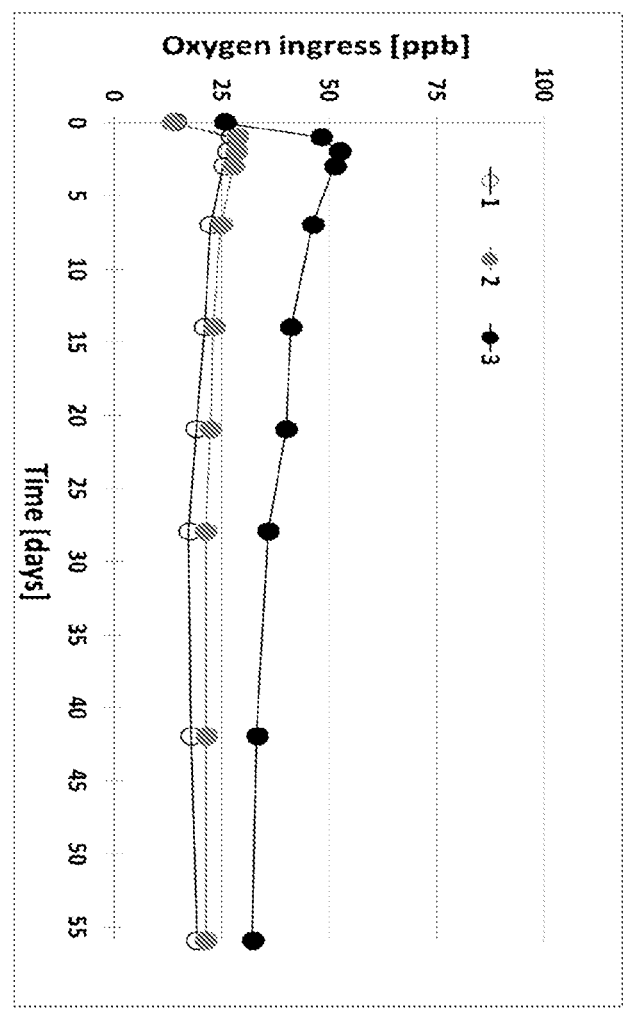
1: Sample 5
2: Sample 6
3: Sample 7

POLYESTER-ETHER RESIN BLENDS

FIELD OF THE INVENTION

The present application relates to novel polyester-ether compositions and their use in polyester resins.

BACKGROUND

Polyesters have been replacing glass and metal packaging materials due to their lighter weight, decreased breakage compared to glass, and potentially lower cost. One major deficiency with standard polyesters, however, is its relatively high gas permeability. This curtails the shelf life of carbonated soft drinks and oxygen sensitive beverages or foodstuff such as beer, wine, tea, fruit juice, ketchup, cheese and the like. Organic oxygen scavenging materials have been developed partly in response to the food industry's goal of having longer shelf-life for packaged food. These oxygen scavenging materials are incorporated into at least a portion of the package and remove oxygen from the enclosed package volume which surrounds the product or which may leak into the package, thereby inhibiting spoilage and prolonging freshness.

Suitable oxygen scavenging materials include oxidizable organic polymers which may react with ingressing oxygen. One example of an oxidizable organic polymer is a polyether. The polyether is typically used as a polyester-ether copolymer and in low amounts of less than 10 weight percent of the packaging material. The polyester-ether is dispersed in the matrix polyester phase and interacts with a suitable oxygen scavenging catalyst that catalyzes the reaction of the ingressing oxygen with the polyether. Oxygen scavenging catalysts are typically transition metal compounds, for example an organic or inorganic salt of cobalt. Other examples include manganese, copper, chromium, zinc, iron and nickel.

Polyester containers comprising polyester-ethers and an oxygen scavenging catalyst show excellent oxygen barrier properties. However, polyethers are also lacking in stability. During preparation and processing the polyether-containing material into articles and containers, undesirable degradation products such as acetaldehyde, tetrahydrofuran, and other $C_2$- to $C_4$-molecules may be produced in various amounts. These side products can inter alia cause undesirable off-tastes in the product. The problem is aggravated by the presence of the transition metal oxygen scavenging catalyst. The oxygen scavenging catalyst may also catalyze polyether degradation reactions. However, the transition metal based oxygen scavenging catalyst may impart color to the resin and may catalyze unwanted degradation processes in the resin. Therefore, it is often desirable to minimize the amount of metal based oxygen scavenging catalysts.

The amount of degradation products may in turn be reduced by adding stabilizers to the resin blend. It is commonly believed that these stabilizers reduce the amount of degradation products by scavenging radicals generated during production of the resins and their processing to the final articles. However, the use of such stabilizers is considered to be problematic in its own way: Stabilizers are considered to attenuate all radical reactions. Since the oxygen scavenging reaction also involves a transition metal-catalyzed radical mechanism, the presence of such stabilizers is considered to also negatively affect the oxygen barrier properties. In other words, the use of stabilizers reduces side-products in the packaging material but also deteriorates the oxygen barrier properties. Therefore, the use of stabilizers is limited in practical application.

There is a need in the art to provide polyether-containing resins which have reduced amounts of degradation products such as acetaldehyde, tetrahydrofuran, and other $C_2$- to $C_4$-molecules but still provided excellent oxygen-scavenging properties.

For some applications, for example juice applications, it is advantageous that the induction time, i.e. the time lapsed until the barrier material effectively scavanges ingressing oxygen, is as short as possible. Many polyester-ether containing polyester resins provide overall excellent barrier properties but have rather long induction times. Thus, there is a need for barrier materials that have shorter induction times.

One method of addressing gas permeability involves incorporating an oxygen scavenger into the package structure itself. In such an arrangement, oxygen scavenging materials constitute at least a portion of the package, and these materials remove oxygen from the enclosed package volume which surrounds the product or which may leak into the package, thereby inhibiting spoilage and prolonging freshness in the case of food products.

Suitable oxygen scavenging materials include oxidizable organic polymers in which either the backbone or the side-chains of the polymer react with oxygen. Such oxygen scavenging materials are typically employed with a suitable catalyst, for example, an organic or inorganic salt of a transition metal such as cobalt.

One example of an oxidizable organic polymer is a polyether. The polyether is typically used as polyester-ether copolymer and in low amounts of less than 10 weight percent of the packaging material. Typically, the polyester-ether is dispersed in the polyester phase and forms discrete domains within this phase.

Polyester containers comprising polyester-ethers and an oxidation catalyst show excellent oxygen barrier properties, but suffer from a delamination phenomenon: When such containers are subjected to shock, e.g. by dropping the container from greater heights, the container may delaminate. This is a surprising type of material failure since the container is a monolayer bottle made from a homogeneous blend of polyester and polyester-ether. Nevertheless, the bottle delaminates as if it is made of a multilayer material. Delamination is a major concern for the packaging industry since delaminated containers may leak and since customers may not be willing to accept defects in appearance caused by delamination. In addition, delamination may have a negative impact on barrier properties. Also in film applications delamination may be undesirable.

There is a need in the art to provide oxygen-scavenging materials having a reduced delamination behavior.

SUMMARY OF THE INVENTION

First Aspect

It was now surprisingly found that certain hindered amine light stabilizers (HALS) are, on the one hand, particularly efficient in reducing the above-mentioned degradation products in polyester-ether-compositions and, on the other hand, do not excessively reduce oxygen barrier properties.

Accordingly, in one aspect, there is provided a composition for preparing an article, preform or container comprising:

a) 80-98.5 parts by weight of a base polyester;
b) 0.5-20 parts by weight of a copolyester-ether, b1) wherein the copolyester-ether comprises one or more polyester segments and one or more polyether segments,
b2) wherein the one or more polyether segments are present in an amount of about 5 to about 95 wt.-% of the copolyester-ether,
b3) wherein the weight ratio of the one or more polyether segments to the total amount of base polyester and polyester segments in the composition is 0.2-10 wt.-%;
c) a transition metal-based oxidation catalyst; and
d) a monomeric, oligomeric or polymeric hindered amine light stabilizer (HALS) in an amount of 15-10,000 ppm, on basis of the weight of the stabilizer in the total composition, wherein the HALS is represented by the formula (I) or a mixture of compounds of formula (I),

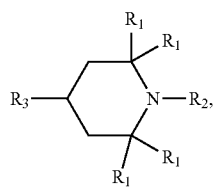

(I)

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS.

There are also provided articles, preforms and containers comprising or prepared from such a composition.

In another aspect, there is provided a masterbatch for use in preparing an article, preform or container comprising:
a) copolyester-ether, wherein the copolyester-ether comprises one or more polyester segments and one or more polyether segments, wherein the one or more polyether segments are present in an amount of about 5 to about 95 wt.-% of the copolyester-ether; and
b) a monomeric, oligomeric or polymeric hindered amine light stabilizer (HALS) in an amount of 100-30,000 ppm, on basis of the weight of the stabilizer in the total composition, wherein the HALS is represented by the formula (I) or a mixture of compounds of formula (I),

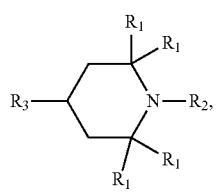

(I)

wherein each $R_1$ independently from each represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS. The masterbatch preferably does not contain inorganic (tinting) pigments in an amount of above 0.6 wt.-% of the total masterbatch and carbon black in an amount of above 1.2 wt.-% of the total masterbatch. The masterbatch is preferably not a slush molded elastomeric composition, layer or article.

In another aspect, there is provided a method of preparing a masterbatch for use in preparing an article, preform or container comprising mixing a copolyester-ether, wherein the copolyester-ether comprises one or more polyester segments and one or more polyether segments, wherein the one or more polyether segments are present in an amount of about 5 to about 95 wt.-% of the copolyester-ether; with a monomeric, oligomeric or polymeric hindered amine light stabilizer (HALS) in an amount of 100-30,000 ppm, on basis of the weight of the stabilizer in the total composition, wherein the HALS is represented by the formula (I) or a mixture of compounds of formula (I),

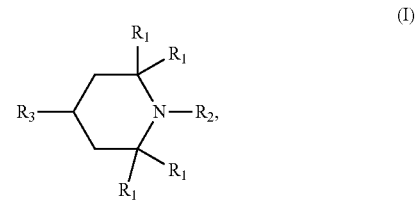

(I)

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS.

In another aspect, there is provided a method of preparing a composition for use in preparing an article, preform or container comprising mixing 80-98.5 parts by weight of a base polyester with:
a) 0.5-20 parts by weight of a copolyester-ether, wherein the copolyester-ether comprises one or more polyester segments and one or more polyether segments, wherein the one or more polyether segments are present in an amount of about 5 to about 95 wt.-% of a copolyester-ether,
b) a transition metal-based oxidation catalyst; and
c) a monomeric, oligomeric or polymeric hindered amine light stabilizer (HALS) in an amount of 15-10,000 ppm, on basis of the weight of the stabilizer in the total composition, wherein the HALS is represented by the formula (I) or a mixture of compounds of formula (I),

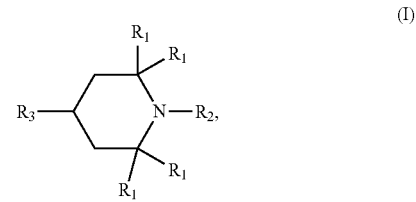

(I)

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS.

In another aspect, there is provided the use of a monomeric, oligomeric or polymeric hindered amine light stabilizer (HALS), wherein the HALS is represented by the formula (I) or a mixture of compounds of formula (I),

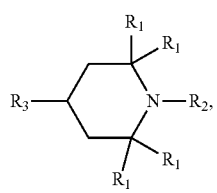

(I)

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS; for reducing the amount of decomposition products in an article, preform or container comprising: 80-98.5 parts by weight of a base polyester; 0.5-20 parts by weight of a copolyester-ether, wherein the copolyester-ether comprises one or more polyester segments and one or more polyether segments, and wherein the one or more polyether segments are present in an amount of about 5 to about 95 wt.-% of the copolyester-ether, and a transition metal-based oxidation catalyst.

Second Aspect

It was now found that the introduction of a titanium compound into the polymer resin improves oxygen barrier properties if the resin further comprises a traditional transition metal-based oxidation catalyst such as a cobalt compound. This is highly surprising since the very same titanium compound provides only poor oxygen barrier properties on its own. Without wishing to be limited by theory, it appears that the titanium compound acts as a co-catalyst in combination with the transition metal-based oxidation catalyst and that both compounds work together in a complementary manner to surprisingly improve oxygen barrier properties of the resin. Furthermore, already a very small amount of the titanium compound provides a very substantial increase in oxygen barrier properties. Thus, the overall amount of transition metals in the resin can be reduced. Most advantageously, it is possible to use the titanium compound as transesterification or polycondensation catalyst. If the titanium compound has such a dual purpose, the overall amount of transition metals in the resin can even be further reduced.

Accordingly, in one aspect, there is provided a composition for preparing articles, preforms or containers comprising:
a) 80-99.5 parts by weight of a base polyester;
b) 0.5-20 parts by weight of a copolyester-ether, wherein the copolyester-ether comprises one or more polyester segments and one or more polyether segments; and
c) a transition metal-based oxidation catalyst,
  c1) wherein the transition metal is selected from cobalt, manganese, copper, chromium, zinc, iron, and nickel, and
  c2) wherein the transition metal based oxidation catalyst is present in an amount of 10-500 ppm, on basis of the weight of the transition metal in the total composition; and;
d) a titanium compound,
wherein the weight ratio of the transition metal-based oxidation catalyst to the titanium compound, on basis of the weight of the transition metal and the titanium, is from 50:1 to 1:1.

In another aspect, there is provided a "salt-and-pepper" mixture of masterbatches, more specifically a kit-of-parts for use in preparing articles, preforms or containers comprising two masterbatches which may optionally be in admixture:
a first masterbatch comprising:
  a) a base polyester,
  b) a transition metal-based oxidation catalyst, wherein the transition metal is selected from cobalt, manganese, copper, chromium, zinc, iron, and nickel, and
  c) a titanium compound, wherein the titanium compound is present in an amount of about 5 to about 500 ppm, on basis of the weight of the titanium in the first masterbatch; and
a second masterbatch comprising:
  d) a copolyester-ether; and optionally
  e) one or more antioxidants.

In another aspect, there are provided an article, preform or container prepared from a composition or kit-of-parts of the above aspects.

In another aspect, there is provided a method of preparing a composition for use in preparing articles, preforms or containers comprising mixing:
a) 80-99.5 parts by weight of a base polyester;
b) 0.5-20 parts by weight of a copolyester-ether, wherein the copolyester-ether comprises one or more polyester segments and polyether segments; and
c) a transition metal-based oxidation catalyst,
  c1) wherein the transition metal is selected from cobalt, manganese, copper, chromium, zinc, iron, and nickel, and
  c2) wherein the transition metal based oxidation catalyst is present in an amount of 10-500 ppm, on basis of the weight of the transition metal in the total composition; and
d) a titanium compound;
wherein the weight ratio of the transition metal-based oxidation catalyst to the titanium compound, on basis of the weight of the transition metal and the titanium, is from 50:1 to 1:1.

In still another aspect, there is provided a method of preparing a kit-of-parts for use in preparing articles, preforms or containers comprising combining two masterbatches,
the first masterbatch comprising:
  a) a base polyester,
  b) a transition metal-based oxidation catalyst, wherein the transition metal is selected from
cobalt, manganese, copper, chromium, zinc, iron, and nickel, and
  c) a titanium compound, wherein the titanium compound is present in an amount of about 5 to about 500 ppm, on basis of the weight of the titanium in the first masterbatch; and the second masterbatch comprising:
  d) a copolyester-ether; and optionally
  e) one or more antioxidants.

Third Aspect

Accordingly, in one aspect, there is provided a composition for preparing articles, preforms or containers comprising:
a) 80-99.5 parts by weight of a base polyester;
b) 0.5-20 parts by weight of a copolyester-ether,
  b1) wherein the copolyester-ether comprises one or more polyester segments and one or more polyether segments, and b2) wherein the one or more polyether segments are present in an amount of 5 to 45 wt.-% of the copolyester-ether;

c) a transition metal-based oxidation catalyst, c1) wherein the transition metal is selected from cobalt, manganese, copper, chromium, zinc, iron, and nickel, and c2) wherein the transition metal based oxidation catalyst is present in an amount of 10-500 ppm, on basis of the weight of the transition metal in the total composition; and d) a titanium compound.

In one aspect of the invention, there is provided a kit-of-parts for use in preparing articles, preforms or containers comprising two masterbatches which may optionally be in admixture:

the first masterbatch comprising:
  a) a base polyester,
  b) a transition metal-based oxidation catalyst, wherein the transition metal is selected from cobalt, manganese, copper, chromium, zinc, iron, and nickel, and wherein the transition metal based oxidation catalyst is present in an amount of 500-15000 ppm, on basis of the weight of the transition metal in first masterbatch,
  c) a titanium compound; and the second masterbatch comprising:
  d) a copolyester-ether,
  d1) wherein the copolyester-ether comprises one or more polyester segments and one or more polyether segments, and
  d2) wherein the one or more polyether segments are present in an amount of 5 and 45 wt.-% in the copolyester-ether; and optionally
  e) one or more antioxidants.

In one aspect of the invention, there are provided an article, preform or container prepared from a composition or a kit-of-parts of the above aspects.

In still another aspect, there is provided a method of preparing a composition for use in preparing articles, preforms or containers comprising mixing:

a) 80-99.5 parts by weight of a base polyester;

b) 0.5-20 parts by weight of a copolyester-ether, b1) wherein the copolyester-ether comprises one or more polyester segments and one or more polyether segments, and b2) wherein the one or more polyether segments are present in an amount of 5 to 45 wt.-% of the copolyester-ether;

c) a transition metal-based oxidation catalyst, c1) wherein the transition metal is selected from cobalt, manganese, copper, chromium, zinc, iron, and nickel, and c2) wherein the transition metal based oxidation catalyst is present in an amount of 10-500 ppm, on basis of the weight of the transition metal in the total composition; and d) a titanium compound.

In another aspect, there is provided a method of preparing a kit-of-parts for use in preparing articles, preforms or containers comprising combining two masterbatches the first masterbatch comprising:
  a) a base polyester,
  b) a transition metal-based oxidation catalyst, wherein the transition metal is selected from cobalt, manganese, copper, chromium, zinc, iron, and nickel, and wherein the transition metal based oxidation catalyst is present in an amount of 500-15000 ppm, on basis of the weight of the transition metal in first masterbatch,
  c) a titanium compound; and the second masterbatch comprising:
  d) a copolyester-ether,
  d1) wherein the copolyester-ether comprises one or more polyester segments and one or more polyether segments, and
  d2) wherein the one or more polyether segments are present in an amount of 5 and 45 wt.-% in the copolyester-ether; and optionally
  e) one or more antioxidants.

Fourth Aspect

It was surprisingly found that polyester articles comprising the polyester-ethers of the present invention show reduced delamination. It was further found that delamination is reduced if the melting point of these copolyester-ethers is matched to be in the region of the melting point of the polyester used as base resin to prepare the container. Since polyesters used for container applications typically have melting points of about 240-250° C., this means that those copolyester-ethers of the present invention having melting points between about 225° C. and 250° C. are particularly suitable for reducing delamination in containers.

Without wishing to be bound by theory, it is believed that the reason for the observed reduced delamination is that localized stress induced by e.g. dropping the container is more readily relaxed in the container wall if the copolyester-ether domains are formed from the copolyester-ethers of the present invention. This is supported by the finding that the reduced delamination behavior correlates with the melting point of the copolyester-ethers of the present invention. Again without wishing to be bound by theory, it appears that viscous dissipation of fracture energy is favored by matching the melting points of the polyester base resin and the copolyester-ether of the present invention.

Accordingly, in one aspect, there is provided a composition for preparing an article, preform or container comprising:

a) 80-99.5 parts by weight of a base polyester;

b) 0.5-20 parts by weight of a copolyester-ether, wherein the copolyester-ether comprises one or more polyester segments and one or more polyether segments, wherein the one or more polyether segments are present in an amount of about 5 to about 45 wt.-% of the copolyester-ether; and c) a transition metal-based oxidation catalyst;

wherein the melting point difference, determined according to ASTM D 3418-97, between the base polyester and the copolyester-ether is less than 15° C.

There are also provided an article or preform comprising or prepared from such a composition as well as a container comprising or prepared from such a composition or preform.

In another aspect, there is provided a masterbatch for use in preparing an article, preform or container comprising, preferably consisting of:

a) a copolyester-ether,
  a1) wherein the copolyester-ether comprises one or more polyethylene terephthalate (co)polymer segments and one or more linear or branched poly ($C_2$-$C_6$-alkylene glycol) segments,
  a2) wherein the one or more polyether segments are present in an amount of from about 5 to about 45 wt.-% in the copolyester-ether, and a3) wherein the melting point, determined according to ASTM D 3418-97, of the copolyester-ether is from 225° C. to 250° C.; and b) from 20 to 5000 ppm, on basis of the weight of the one or more linear or branched poly ($C_2$-$C_6$-alkylene glycol) segments, of one or more antioxidants selected from group consisting of hindered phenols, benzophenones, sulfur-based antioxidants, phosphites and hindered amine light stabilizers.

The masterbatch may optionally comprise, preferably consist of, one or more of a polyester or a copolyester, a transition metal-based oxidation catalyst, an ionic compatibilizer and one or more additives selected from the group consisting of dyes, pigments, fillers, branching agents, reheat agents, anti-blocking agents, anti-static agents, biocides, blowing agents, coupling agents, flame retardants, heat stabilizers, impact modifiers, crystallization aids, lubricants, plasticizers, processing aids, buffers, and slip agents.

In another aspect, there is provided a copolyester-ether comprising one or more polyethylene terephthalate (co)polymer segments and one or poly(butylene glycol) or poly(propylene glycol) segments, wherein the one or more poly(butylene glycol) or poly(propylene glycol) segments are present in an amount of from about 20 to about 35 wt.-% in the copolyester-ether, and having a melting point, determined according to ASTM D 3418-97, of from 225° C. to 250° C.

In another aspect, there is provided a method of preparing an article, preform or container, wherein 80-99.5 parts by weight of a base polyester are blended with:
a) 0.5-20 parts by weight of a copolyester-ether, wherein the copolyester-ether comprises one or more polyester segments and one or more polyether segments, wherein the one or more polyether segments are present in an amount of about 5 to about 45 wt.-% of the copolyester-ether; and
b) a transition metal-based oxidation catalyst; wherein the melting point difference, determined according to ASTM D 3418-97, between the polyester and the copolyester-ether is less than 15° C.

In another aspect, there is provided the use of a copolyester-ether for preparing an article, preform or container; wherein the copolyester-ether comprises one or more polyester segments and one or more polyether segments, and wherein the one or more polyether segments are present in the copolyester-ether in an amount of from about 5 to about 45 wt.-%, and wherein the melting point of the copolyester-ether, determined according to ASTM D 3418-97, is from 225° C. to 250° C.

There is also provided the use of such a copolyester-ether for preparing a kit-of-parts comprising said copolyester-ether and physical or electronic instructions or advises to use said copolyester-ether for preparing a preform or container.

BRIEF DESCRIPTION OF THE FIGURES

FIG. 1 is a line graph depicting oxygen ingress in titanium containing blends of samples 5, 6, and 7.

DETAILED DESCRIPTION

The following detailed description of components is applicable to all of the above-mentioned aspects of the present invention. In addition, individual elements of the detailed description are intended to be freely combinable with the above various aspects of the invention.

Generally, polyesters suitable for the present invention can be prepared by one of two processes, namely: (1) the ester process and (2) the acid process. The ester process is where a dicarboxylic ester (such as dimethyl terephthalate) is reacted with ethylene glycol or other diol in an ester interchange reaction. Catalysts for use in the ester interchange reaction are well known and may be selected from manganese, zinc, cobalt, titanium, calcium, magnesium or lithium compounds. Because the reaction is reversible, it is generally necessary to remove the alcohol (e.g. methanol when dimethyl terephthalate is employed) to completely convert the raw materials into monomers. The catalytic activity of the interchange reaction catalyst may optionally be sequestered by introducing a phosphorus compound, for example polyphosphoric acid, at the end of the ester interchange reaction. Then the monomer undergoes polycondensation. The catalyst employed in this reaction is typically an antimony, germanium, aluminum, zinc, tin or titanium compound, or a mixture of these. In some embodiments, it may be advantageous to use a titanium compound. In the second method for making polyester, an acid (such as terephthalic acid) is reacted with a diol (such as ethylene glycol) by a direct esterification reaction producing monomer and water. This reaction is also reversible like the ester process and thus to drive the reaction to completion one must remove the water. The direct esterification step does not require a catalyst. The monomer then undergoes polycondensation to form polyester just as in the ester process, and the catalyst and conditions employed are generally the same as those for the ester process. In summary, in the ester process there are two steps, namely: (1) an ester interchange, and (2) polycondensation. In the acid process there are also two steps, namely: (1) direct esterification, and (2) polycondensation.

Suitable polyesters can be aromatic or aliphatic polyesters, and are preferably selected from aromatic polyesters. An aromatic polyester is preferably derived from one or more diol(s) and one or more aromatic dicarboxylic acid(s). The aromatic dicarboxylic acid includes, for example, terephthalic acid, isophthalic acid, 1,4-, 2,5-, 2,6- or 2,7-naphthalenedicarboxylic acid and 4,4'-diphenyldicarboxylic acid (and of these terephthalic acid is preferred). The diol is preferably selected from aliphatic and cycloaliphatic diol(s), including, for example, ethylene glycol, 1,4-butanediol, 1,4-cyclohexane dimethanol, and 1,6-hexanediol (and of these, aliphatic diols, and preferably ethylene glycol, is preferred). Preferred polyesters are polyethylene terephthalate (PET) and polyethylene-2,6-naphthalene dicarboxylate (also referred to herein as polyethylene-2,6-naphthalate), and particularly preferred is PET.

Examples of suitable polyesters include those produced from the reaction of a diacid or diester component comprising at least 65 mol.-% aromatic diacid (preferably terephthalic acid) or the $C_1$-$C_4$ dialkyl ester of the aromatic acid (preferably $C_1$-$C_4$ dialkylterephthalate), for example at least 70 mol.-% or at least 75 mol.-% or at least 95 mol.-%, with a diol component comprising at least 65 mol.-% diol (preferably ethylene glycol), for example at least 70 mol. % or at least 75 mol.-% or at least 95 mol.-%. Exemplary polyesters include those wherein the diacid component is terephthalic acid and the diol component is ethylene glycol, thereby forming polyethylene terephthalate (PET). The mole percent for all the diacid components totals 100 mol.-%, and the mole percentage for all the diol components totals 100 mol.-%.

The polyester may be modified by one or more diol components other than ethylene glycol. In this case, the polyester is a copolyester. Suitable diol components of the described polyester may be selected from 1,4-cyclohexane-dimethanol, 1,2-propanediol, 1,4-butanediol, 2,2-dimethyl- 1, 3-propanediol, 2-methyl-1,3-propanediol (2 MPDO) 1,6-hexanediol, 1,2-cyclo-hexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol or mixtures of these, and the like. In general, these diols contain 2 to 18, preferably 2 to 8 carbon atoms. Cycloaliphatic diols can be employed in their cis- or trans-configuration or as mixture of both forms. Suitable modifying diol components can be 1,4-cyclohexanedimethanol or diethylene glycol, or a mixture of these.

The polyester may be modified by one or more acid components other than terephthalic acid. In this case, the polyester is a copolyester. Suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid, bibenzoic acid, or mixtures of these and the like. In the polymer preparation, it is possible to use a functional acid derivative of the above acid components. Typical functional acid derivatives include the dimethyl, diethyl, or dipropyl ester of the dicarboxylic acid or its anhydride.

As used herein, the term "base polyester" refers to a polyester component which is the predominant component of the total composition, i.e. used in excess of 50 wt.-% of the total composition, in particular in excess of 80 wt.-%, more specifically in excess of 90 wt.-%.

Advantageously, the polyester is a copolyester of ethylene glycol with a combination of terephthalic acid and isophthalic acid and/or 5-sulfoisophthalic acid. Generally, the isophthalic acid can be present from about 0.05 mol.-% to about 10 mol.-% and the 5-sulfoisophthalic acid from can be present from about 0.1 mol.-% to about 3 mol.-% of the copolymer.

Advantageously, the polyester is selected from polyethylene terephthalate, polyethylene naphthalate, polyethylene isophthalate, copolymers of polyethylene terephthalate, copolymers of polyethylene naphthalate, copolymers of polyethylene isophthalate, or mixtures thereof; for example the polyester can be a copolymer of polyethylene terephthalate, such as poly(ethylene terephthalate-co-ethylene isophthalate) or poly(ethylene terephthalate-co-ethylene 5-sulfoisophthalate).

First Aspect

The composition for preparing an article, preform or container comprises 80-98.5 parts by weight of a base polyester, including 85-98.5, 90-98.5, or 95-98.5 parts by weight of the base polyester. Preferably, the composition comprises 90-98.5 parts by weight of the base polyester.

Copolyester-ethers suitable for the present invention comprise one or more polyester segments and one or more polyether segments having a number-average molecular weight of from about 200 to about 5000 g/mol. Advantageously, the copolyester-ether has a number-average molecular weight of from about 600 to about 2500 g/mol, more specifically about 800 to about 1800 g/mol or about 1000 to about 1600 g/mol. The Copolyester-ethers are present in the composition in an amount from 0.5-20 parts by weight, including 0.5-15 parts by weight, 0.5-10 parts by weight, and 0.5-5 parts by weight. Preferably, the composition comprises 0.5-10 parts by weight of the copolyester-ethers.

The one or more polyether segments may advantageously be present in an amount of about 5 to about 60 wt.-% of the copolyester-ether. Advantageously, the polyether segments are present in an amount of about 10 to about 45 wt.-%, more specifically about 20 to about 40 wt.-%, or in particular about 25 to about 35 wt.-% or about 25 to about 30 wt.-%, in all cases based on the copolyester-ether.

Generally, copolyester-ethers suitable for the present invention comprise one or more polyether segments in amounts so that the weight ratio of the one or more polyether segments to the total amount of base polyester and polyester segments in the composition is about 0.2 to about 15 wt.-%, more specifically about 0.5 to about 10 wt.-%, or in particular about 0.7 to about 5 wt.-%, or about 0.5 to about 1.5 wt.-%, or about 1 to about 2.5 wt.-%.

Advantageously, the polyether segment is a poly ($C_2$-$C_6$-alkylene glycol) segment. The $C_2$-$C_6$-alkylene glycol may be a linear or branched aliphatic $C_2$-$C_6$-moiety. Specific examples of such copolyester-ethers include poly(ethylene glycol), linear or branched poly(propylene glycol), linear or branched poly(butylene glycol), linear or branched poly(pentylene glycol), linear or branched poly(hexylene glycol) as well as mixed poly ($C_2$-$C_6$-alkylene glycols) obtained from two or more of the glycolic monomers used in preparing the before-mentioned examples. Advantageously, the polyether segment is a linear or branched poly(propylene glycol) or a linear or branched poly(butylene glycol).

The copolyester-ethers suitable for the present invention also comprise one or more polyester segments. The type of polyester in these segments is not particularly limited and can be any of the above-referenced polyesters. Advantageously, the copolyester-ether comprises a polyethylene terephthalate (co)polymer segment. Advantageously, the copolyester-ether comprises a polyethylene terephthalate (co)polymer segment and a linear or branched poly(butylene glycol) segment.

The composition for preparing an article, preform or container comprises 0.5-20 parts by weight of a copolyester-ether, including 0.5-15, 0.5-10, and 0.5-5 parts by weight of the copolyester-ether. Preferably, the composition comprises 0.5-10 parts by weight of the copolyester-ether.

Methods of preparing polyethers and copolyester-ethers are well known in the art. For example, the copolyester-ether can be produced by ester interchange with the dialkyl ester of a dicarboxylic acid. In the ester interchange process dialkyl esters of dicarboxylic acids undergo transesterification with one or more glycols in the presence of a catalyst such as zinc acetate as described in WO 2010/096459 A2, incorporated herein by reference. A suitable amount of elemental zinc in the copolyester-ether can be about 35 to about 100 ppm, for example about 40 to about 80 ppm, by weight of the copolyester-ether. The poly(alkylene oxide) glycols replace part of these glycols in these transesterification processes. The poly(alkylene oxide) glycols can be added with the starting raw materials or added after transesterification. In either case, the monomer and oligomer mixture can be produced continuously in a series of one or more reactors operating at elevated temperature and pressures at one atmosphere or lesser. Alternatively, the monomer and oligomer mixture can be produced in one or more batch reactors. Suitable conditions for these reactions are temperatures of from about 180° C. to 250° C. and pressures of from about 1 bar to 4 bar.

Next, the mixture of copolyester-ether monomer and oligomers undergoes melt-phase polycondensation to produce a polymer. The polymer is produced in a series of one or more reactors operating at elevated temperatures. To facilitate removal of excess glycols, water, and other reaction products, the polycondensation reactors are run under a vacuum. Catalysts for the polycondensation reaction include compounds of antimony, germanium, tin, titanium and/or aluminum. In some embodiments, it may be advantageous to use a titanium compound. A suitable amount of elemental Ti can be about 5 to about 60 ppm, for example about 10 to about 35 ppm. Reaction conditions for polycondensation can include (i) a temperature less than about 290° C., or about 10° C. higher than the melting point of the copolyester-ether; and (ii) a pressure of less than about 0.01 bar, decreasing as polymerization proceeds. This copolyester-ether can be produced continuously in a series of one or more reactors operating at elevated temperature and pressures less than one atmosphere. Alternatively this copolyester-ether can be produced in one or more batch reactors. The intrinsic viscosity after melt phase polymerization can be in the range of about 0.5 dl/g to about 1.5 dl/g. Antioxidants and other additives can be added before and/or during polymerization to control the degradation of the polyester-ether segments. Alternatively, the copolyester-ethers can be produced by reactive extrusion of the polyether with the polyester. In the above-described methods of preparing the copolyester-ethers, it may happen that the polyether does not fully react with the polyester but is partly present as an intimate blend of the polyester and polyether. Therefore, throughout the specification and embodiments, the reference to a copolyester-ether comprising one or more polyester segments and one or more polyether segments is to be understood as referring to the respective copolyester-ethers, blends of respective polyesters and polyethers, and mixtures comprising both the respective copolyester-ethers and blends of the respective polyesters and polyethers.

The copolyester-ether is preferably used in amounts of about 0.5 to about 20 wt.-% in relation to the final composition. Advantageously, the amount of the copolyester-ether is selected within the range of about 0.5 to about 10 wt.-%, in relation to the final container, preform and article composition, so that the amount of polyether segments to the total amount of base polyester and polyester segments in the composition is about 0.2 to about 10 wt.-%, more specifically about 0.5 to about 10 wt.-%, or in particular about 0.7 to about 5 wt.-%, or about 0.5 to about 1.5 wt.-% or about 1 to about 2.5 wt.-%.

Advantageously, the copolyester-ether contains one or more polyether segments in an amount of about 5 to about 45 wt.-%, in particular about 15 to about 45 wt.-%, more specifically about 20 to about 40 wt.-%, and also in particular about 15 to about 35 wt.-%, more specifically about 20 to about 30 wt.-%, and that the amount of the copolyester-ether is selected so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

It is particularly advantageous that the polyether segments in the copolyester-ether have a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 40 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

It is particularly advantageous that the polyether segments in the copolyester-ether are selected from a linear or branched poly(propylene glycol) or a linear or branched poly(butylene glycol) having a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

The HALS used in the embodiments of the present invention is represented by the formula (I) or a mixture of compounds of formula (I),

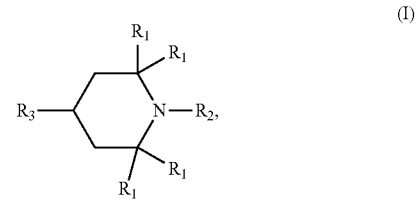

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS. For instance, when the HALS is a polymeric HALS, $R_3$ may represent the polymer backbone of the polymeric HALS. An example of such as HALS is Uvinul® 5050. As a further example, when additionally $R_2$ represents a further part of an oligomeric or polymeric HALS, the piperidine ring in above formula (I) is part of the repeat unit of the oligomeric or polymeric HALS. An example of such a HALS is Uvinul® 5062. The HALS may be a mixture of compounds of formula (I). An example of such a HALS is Uvinul® 4092. Additionally or alternatively, the HALS may be as defined in paragraphs [0043] to [0046] of US 2006/0058435 A1, which are incorporated herein by reference.

Specific HALS suitable for use in the invention are Uvinul® 4050, Uvinul® 4077, Uvinul® 4092, Uvinul® 5050 and Uvinul® 5062. Uvinul® 4050 is particularly preferred. Alternatively, suitable HALS for the invention are: Nylostab®, Hostavin®, and Nylostab® S-EED® from Clariant.

Advantageously, in the above formula (I) each $R_1$ independently represents $C_1$-$C_4$ alkyl, $R_2$ represents H or $C_1$-$C_4$ alkyl, or a further part of an oligomeric or polymeric HALS.

It is particularly advantageous that in the above formula (I) each $R_1$ represents methyl and $R_2$ represents H or methyl.

It is particularly advantageous that the HALS is a monomeric HALS. Preferably, the HALS has a molecular weight of about 400 g/mol or above, or about 400 to about 1500 g/mol, or about 400 to about 1200 g/mol, or in particular about 400 to about 800 g/mol.

It may also be particularly advantageous that the HALS is an oligomeric or polymeric HALS. In those cases it may also be particularly advantageous that the HALS comprises one or more moieties of the formula (I),

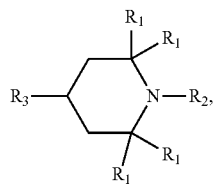

wherein each $R_1$ independently represents $C_1$-$C_4$ alkyl, $R_2$ represents H or $C_1$-$C_4$ alkyl, and $R_3$ represents a further part of the oligomeric or polymeric HALS. It may further be particularly advantageous in some embodiments that in the above formula (I), each $R_1$ represents methyl, $R_2$ represents H or methyl, and $R_3$ represents a further part of the oligomeric or polymeric HALS.

When referring throughout the specification to oligomeric or polymeric HALS, this is to be understood as referring to 2 to 8 repeating units in case of an oligomeric HALS and more than 8 repeating units in case of a polymeric HALS.

In some embodiments of the present invention, it may be particularly advantageous that the HALS is used in an amount of about 20 to about 2500 ppm, or about 30 to about 2000 ppm, or about 40 to about 1000 ppm, and in particular about 50 to about 800 ppm, respective to the weight of the total composition. In the masterbatch embodiments, the amount of HALS may be substantially higher, for instance about 250 to about 10,000 ppm, or about 750 to about 10,000 ppm, or in particular about 1000 to about 5000 ppm, respective to the weight of the total masterbatch.

In some embodiments of the present invention, it may be particularly advantageous that the polyether segments in the copolyester-ether have a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%; and that HALS is represented by the formula (I) or a mixture of compounds of formula (I),

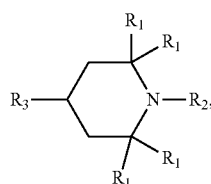

wherein each $R_1$ independently represents $C_1$-$C_4$ alkyl, in particular methyl, $R_2$ represents H or $C_1$-$C_4$ alkyl, in particular H, and $R_3$ represents a further part of a monomeric, oligomeric or polymeric HALS.

In some embodiments of the present invention, it may be particularly advantageous that the polyether segments in the copolyester-ether are selected from a linear or branched poly(propylene glycol) or a linear or branched poly(butylene glycol) having a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%; and that the HALS is represented by the formula (I) or a mixture of compounds of formula (I),

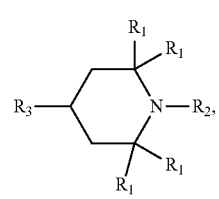

wherein each $R_1$ independently represents $C_1$-$C_4$ alkyl, in particular methyl, $R_2$ represents H or $C_1$-$C_4$ alkyl, in particular H, and $R_3$ represents a further part of a monomeric, oligomeric or polymeric HALS.

It may be particularly advantageous that the copolyester-ether and/or the polyester is produced using a titanium-based polycondensation catalyst. In particular, it may be advantageous that the polyester is produced using a titanium-based polycondensation catalyst.

It may be particularly advantageous that the weight ratio of titanium metal to HALS compound is about 1:2 to about 1:500, or about 1:10 to about 1:250, in particular about 1:50 to about 1:200 in the final composition.

Where the invention may further comprise a transition metal-based oxidation catalyst, suitable oxidation catalysts include those transition metal catalysts that activate or promote the oxidation of the copolyester-ether by ambient oxygen. Examples of suitable transition metals may include compounds comprising cobalt, manganese, copper, chromium, zinc, iron, or nickel. The transition metal-based oxidation catalyst may be introduced into the composition in the form of a metal salt. In this case, suitable counter ions for the transition metal include, but are not limited to, carboxylates, such as neodecanoates, octanoates, stearates, acetates, naphthalates, lactates, maleates, acetylacetonates, linoleates, oleates, palminates or 2-ethyl hexanoates, oxides, carbonates, chlorides, dioxides, hydroxides, nitrates, phosphates, sulfates, silicates or mixtures thereof. It is also possible that the transition metal-based oxidation catalyst is incorporated in the polymer matrix during e.g. extrusion. The transition metal-based oxidation catalyst can be added during polymerization of the polyester or compounded into a suitable polyester thereby forming a polyester-based masterbatch that can be added during the preparation of the article. The cobalt compound may be physically separate from the copolyester-ether, for example a sheath core or side-by-side relationship, so as not to activate the copolyester-ether prior to melt blending into a preform or bottle.

Advantageously, the transition metal based oxidation catalyst is a cobalt compound. In the container- or preform-related embodiments of the present invention, it may be advantageous that the transition metal-based oxidation catalyst is a cobalt compound that is present in an amount of about 40 to about 200 ppm, more specifically about 60 to about 120 ppm, on basis of the weight of cobalt in the total composition. Alternatively, it may be advantageous that the transition metal-based oxidation catalyst is a cobalt compound that is present in an amount of about 40 to about 250 ppm, more specifically about 60 to about 200 ppm, on basis of the weight of cobalt in the total composition. In the masterbatch-related embodiments of the present invention, it may be advantageous that the transition metal-based oxidation catalyst is a cobalt compound that is present in an amount of about 50 to about 5,000 ppm, more specifically about 100 to about 2,500 ppm, on basis of the weight of cobalt in the total composition. In the embodiments of the present invention, it may be advantageous that the transition metal-based oxidation catalyst is a cobalt salt, in particular a cobalt carboxylate, and especially a cobalt $C_8$-$C_{20}$ carboxylate.

Advantageously, the weight ratio of metal of the transition metal based oxidation catalyst to HALS compound is about 100:1 to about 1:50 or about 75:1 to about 1:30 in particular about 50:1 to about 1:25, respective to the final composition.

In some embodiments of the present invention, it may be particularly advantageous that the polyether segments in the copolyester-ether are selected from a linear or branched poly(propylene glycol) or a linear or branched poly(butylene glycol) having a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to 1.5 wt.-%, or about 1 to about 2.5 wt.-%. The HALS in this embodiment is represented by the formula (I) or a mixture of compounds of formula (I),

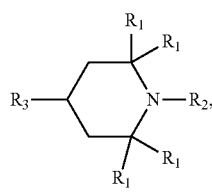
(I)

wherein each $R_1$ independently represents $C_1$-$C_4$ alkyl, in particular methyl, $R_2$ represents H or $C_1$-$C_4$ alkyl, in particular H, and $R_3$ represents a further part of a monomeric, oligomeric or polymeric HALS. The transition metal-based oxidation catalyst in this embodiment is a cobalt compound, in particular a cobalt carboxylate, and especially a cobalt $C_8$-$C_{20}$ carboxylate.

Embodiments in some aspects of the invention may further comprise a further antioxidant selected from the group consisting of hindered phenols, benzophenones, sulfur-based antioxidants, and phosphites. Examples of such antioxidants include, but are not limited to 1,3,5-trimethyl-2,4,6-tris(3,5-di-tert-butyl-4-hydroxybenzyl)-benzene (CAS: 1709-70-2), tetrakis(2,4-di-tert-butylphenyl)-1,1-biphenyl-4,4'-diylbisphosphonite (CAS: 38613-77-3) or pentaerythritol tetrakis(3-(3,5-di-tert-butyl-4-hydroxyphenyl) propionate (CAS: 6683-19-8). Advantageously, one or more antioxidants are used in amounts of about 100 ppm to about 10,000 ppm, more specifically about 200 ppm to about 5,000 ppm or about 300 ppm to about 3,000 ppm, and in particular about 400 ppm to about 2,000 ppm, on basis of the total weight of the antioxidant to the total weight of the polyether composition.

Embodiments in some aspects of the invention may further comprise additives selected from the group consisting of dyes, pigments, fillers, branching agents, reheat agents, anti-blocking agents, anti-static agents, biocides, blowing agents, coupling agents, flame retardants, heat stabilizers, impact modifiers, crystallization aids, lubricants, plasticizers, processing aids, buffers, and slip agents. Representative examples of such additives are well-known to the skilled person.

It may be advantageous that an ionic compatibilizer is present or used. Suitable ionic compatibilizers can for instance be copolyesters prepared by using ionic monomer units as disclosed in WO 2011/031929 A2, page 5, incorporated herein by reference. In the masterbatch embodiments of the present invention, it may be advantageous that the masterbatch is mixed or packaged with another masterbatch comprising the transition metal based oxidation catalyst (a "salt and pepper" mixture). It may be advantageous that the other masterbatch comprising the transition metal based oxidation catalyst further comprises a polyester.

In another aspect of the invention, there is provided a "salt-and-pepper" mixture of masterbatches, more specifically a kit-of-parts for use in preparing articles, preforms or containers comprising two masterbatches which may optionally be in admixture:

a first masterbatch comprising:
 a) a polyester as the predominant masterbatch component, and
 b) a transition metal-based oxidation catalyst, wherein the transition metal is selected from cobalt, manganese, copper, chromium, zinc, iron, and nickel; and a second masterbatch comprising:
 d) a copolyester-ether as the predominant masterbatch component; and
 e) a HALS, preferably one of formula (I),

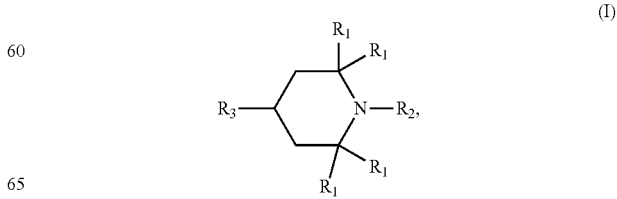
(I)

wherein each $R_1$ independently represents $C_1$-$C_4$ alkyl, in particular methyl, $R_2$ represents H or $C_1$-$C_4$ alkyl, in particular H, and $R_3$ represents a further part of a monomeric, oligomeric or polymeric HALS.

By "predominant masterbatch component" it is meant that the referred to component is present in the masterbatch in more than 50 wt.-%, in particular more than 80 wt.-%, more specifically more than 90 wt.-%.

The above kit-of-part or "salt-and-pepper" mixture is intended to be added to a polyester base resin, i.e. the "salt-and-pepper" mixture serves as a concentrate for introducing transition metal-based oxidation catalyst, the copolyester-ether, and the HALS into the polyester base resin.

In another aspect is provided a kit-of-parts for use in preparing articles, preforms or containers comprising two masterbatches which may optionally be in admixture, wherein the second of the two masterbatches is the masterbatch comprising copolyester-ether as described supra and infra. In some embodiments, the first for the two masterbatches comprises:

a) a polyester as the predominant masterbatch component, and
b) a transition metal-based oxidation catalyst, wherein the transition metal is selected from cobalt, manganese, copper, chromium, zinc, iron, and nickel.

In some embodiments, the polyester in the first masterbatch is polyethylene terephthalate (PET). In some embodiments, the transition metal-based oxidation catalyst is a cobalt compound. In some embodiments, the cobalt compound is a cobalt $C_8$-$C_{20}$ carboxylate.

In this aspect of the invention, it may be particularly advantageous that the polyether segments in the copolyester-ether are selected from a linear or branched poly(propylene glycol) or a linear or branched poly(butylene glycol) having a number-average molecular weight of from about 600 to about 2000 g/mol, in particular about 800 to about 1600 g/mol, that the copolyester-ether contains one or more polyether segments in an amount of about 15 to about 45 wt.-%, in particular about 20 to about 40 wt.-%, and that the transition metal-based oxidation catalyst is a cobalt compound, in particular a cobalt carboxylate, and especially a cobalt $C_8$-$C_{20}$ carboxylate.

It may also be advantageous that the transition metal-based oxidation catalyst is present in amounts of 1000 to 15000 ppm in the first masterbatch, in particular 2000 to 8000 ppm, and more specifically 3000 to 6000 ppm.

It may also be advantageous that the HALS is present in an amount of 100-30,000 ppm, on basis of the weight of the stabilizer in the second masterbatch, in particular 500 to 20,000 ppm, and more specifically 1000 to 10000 ppm.

It may also be advantageous that the copolyester-ether and/or the polyester is produced using a titanium compound, in particular a titanium-based polycondensation catalyst. The titanium-based compound is advantageously present in amount of 2 to 500 ppm Ti, in particular 3 to 400 ppm, more specifically 4 to 200 ppm, or 5 to 50 ppm, on basis of the respective copolyester-ether and/or the polyester masterbatch.

Advantageously, the polyester is selected from polyethylene terephthalate, polyethylene naphthalate, polyethylene isophthalate, copolymers of polyethylene terephthalate, copolymers of polyethylene naphthalate, copolymers of polyethylene isophthalate, or mixtures thereof; for example the polyester can be a copolymer of polyethylene terephthalate, such as poly(ethylene terephthalate-co-ethylene isophthalate) or poly(ethylene terephthalate-co-ethylene 5-sulfoisophthalate). Advantageously, the polyester has an intrinsic viscosity, measured according to the method described in the Test Procedures below, of about 0.6 dl/g to about 1.1 dl/g, in particular about 0.65 dl/g to about 0.95 dl/g.

The disclosed compositions, masterbatches and methods may be used for preparing articles of manufacture. Suitable articles include, but are not limited to, film, sheet, tubing, pipes, fiber, container preforms, blow molded articles such as rigid containers, thermoformed articles, flexible bags and the like and combinations thereof. Typical rigid or semi-rigid articles can be formed from plastic, paper or cardboard cartons or bottles such as juice, milk, soft drink, beer and soup containers, thermoformed trays or cups. In addition, the walls of such articles may comprise multiple layers of materials.

Second Aspect

The composition for preparing an article, preform or container comprises 80-99.5 parts by weight of a base polyester, including 85-99.5, 90-99.5, or 95-99.5 parts by weight of the base polyester. Preferably, the composition comprises 90-99.5 parts by weight of the base polyester.

Generally, copolyester-ethers suitable for the present invention comprise one or more polyester segments and one or more polyether segments. The polyether segments advantageously have a number-average molecular weight of from about 200 to about 5000 g/mol. Advantageously, the polyether segments of the copolyester-ether has a number-average molecular weight of from about 600 to about 2500 g/mol, more specifically between about 800 to about 1800 g/mol or between about 1000 to about 1600 g/mol.

The one or more polyether segments may be present in an amount of about 5 to about 95 wt.-% of the copolyester-ether. Advantageously, the polyether segments are present in an amount of about 5 to about 45 wt.-%, or about 15 to about 45 wt.-%, more specifically about 10 to about 40 wt.-%, or about 20 to about 40 wt.-%, or in particular about 25 to about 35 wt.-% or about 25 to about 30 wt.-%, in all cases based on the copolyester-ether.

Generally, copolyester-ethers suitable for the present invention comprise one or more polyether segments in amounts so that the weight ratio of the one or more polyether segments to the total amount of base polyester and polyether segments in the composition is about 0.2 to about 10 wt.-%, more specifically about 0.5 to about 10 wt.-%, or in particular about 0.7 to about 5 wt.-%, or 0.5 to 1.5 wt.-%, or about 1 to about 2.5 wt.-%.

Advantageously, the polyether segment is a poly ($C_2$-$C_6$-alkylene glycol) segment. The $C_2$-$C_6$-alkylene glycol may be a linear or branched aliphatic $C_2$-$C_6$-moiety. Specific examples of such copolyester-ethers include poly(ethylene glycol), linear or branched poly(propylene glycol), linear or branched poly(butylene glycol), linear or branched poly(pentylene glycol), linear or branched poly(hexylene glycol) as well as mixed poly ($C_2$-$C_6$-alkylene glycols) obtained from two or more of the glycolic monomers used in preparing the before-mentioned examples. Advantageously, the polyether segment is a linear or branched poly(propylene glycol) or a linear or branched poly(butylene glycol).

The copolyester-ethers suitable for the present invention also comprise one or more polyester segments. The type of polyester in these segments is not particularly limited and can be any of the above-referenced polyesters. Advantageously, the copolyester-ether comprises a polyethylene terephthalate (co)polymer segment. Advantageously, the copolyester-ether comprises a polyethylene terephthalate (co)polymer segment and a linear or branched poly(butylene glycol) segment.

The composition for preparing an article, preform or container comprises 0.5-20 parts by weight of a copolyester-ether, including 0.5-15, 0.5-10, or 0.5-5 parts by weight of the copolyester-ether. Preferably, the composition comprises 1-5 parts by weight of the copolyester-ether.

Methods of preparing polyethers and copolyester-ethers are well known in the art. For example, the copolyester-ether can be produced by ester interchange with the dialkyl ester of a dicarboxylic acid. In the ester interchange process dialkyl esters of dicarboxylic acids undergo transesterification with one or more glycols in the presence of a catalyst such as zinc acetate as described in WO 2010/096459 A2, incorporated herein by reference. A suitable amount of elemental zinc in the copolyester-ether can be about 35 to about 100 ppm, for example about 40 to about 80 ppm, by weight of the copolyester-ether. The poly(alkylene oxide) glycols replace part of these glycols in these transesterification processes. The poly(alkylene oxide) glycols can be added with the starting raw materials or added after transesterification. In either case, the monomer and oligomer mixture can be produced continuously in a series of one or more reactors operating at elevated temperature and pressures at one atmosphere or lesser. Alternatively, the monomer and oligomer mixture can be produced in one or more batch reactors. Suitable conditions for these reactions are temperatures of from about 180° C. to 250° C. and pressures of from about 1 bar to 4 bar.

Next, the mixture of copolyester-ether monomer and oligomers undergoes melt-phase polycondensation to produce a polymer. The polymer is produced in a series of one or more reactors operating at elevated temperatures. To facilitate removal of excess glycols, water, and other reaction products, the polycondensation reactors are run under a vacuum. Catalysts for the polycondensation reaction include compounds of antimony, germanium, tin, titanium and/or aluminum. In some embodiments, it may be advantageous to use a titanium compound. A suitable amount of elemental Ti can be about 5 to about 60 ppm, for example about 10 to 35 ppm. Reaction conditions for polycondensation can include (i) a temperature less than about 290° C., or about 10° C. higher than the melting point of the copolyester-ether; and (ii) a pressure of less than about 0.01 bar, decreasing as polymerization proceeds. This copolyester-ether can be produced continuously in a series of one or more reactors operating at elevated temperature and pressures less than one atmosphere. Alternatively this copolyester-ether can be produced in one or more batch reactors. The intrinsic viscosity after melt phase polymerization can be in the range of about 0.5 dl/g to about 1.5 dl/g. Antioxidants and other additives can be added before and/or during polymerization to control the degradation of the polyester-ether segments. Alternatively, the copolyester-ethers can be produced by reactive extrusion of the polyether with the polyester. In the above-described methods of preparing the copolyester-ethers, it may happen that the polyether does not fully react with the polyester but is partly present as an intimate blend of the polyester and polyether. Therefore, throughout the specification and embodiments, the reference to a copolyester-ether comprising one or more polyester segments and one or more polyether segments is to be understood as referring to the respective copolyester-ethers, blends of respective polyesters and polyethers, and mixtures comprising both the respective copolyester-ethers and blends of the respective polyesters and polyethers.

The copolyester-ether is preferably used in amounts of about 0.5 to about 20 wt.-% in relation to the final composition. Advantageously, the amount of the copolyester-ether is selected within the range of about 0.5 to about 20 wt.-%, in relation to the final container, preform or article composition, so that the amount of polyether segments to the total amount of base polyester and polyester segments in the composition is about 0.2 to about 10 wt.-%, more specifically about 0.5 to about 10 wt.-%, or in particular about 0.7 to about 5 wt.-%, or about 0.5 to about 1.5 wt.-% or about 1 to about 2.5 wt.-%.

It is particularly advantageous that the copolyester-ether contains one or more polyether segments in an amount of about 5 to about 45 wt.-%, in particular about 15 to about 35 wt.-%, more specifically about 20 to about 30 wt.-%, and that the amount of the copolyester-ether is selected so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt. %.

It is particularly advantageous that the polyether segments in the copolyester-ether have a number-average molecular weight of from about 600 to about 2500 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

It is particularly advantageous that the polyether segments in the copolyester-ether are selected from a linear or branched poly(propylene glycol) or a linear or branched poly(butylene glycol) having a number-average molecular weight of from about 600 to about 2500 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

Advantageously, the copolyester-ether and/or the polyester is produced using a titanium-based polycondensation and/or transesterification catalyst. In particular, it may be advantageous that the polyester is produced using a titanium-based polycondensation catalyst.

The compositions, kit-of-parts and processes of the invention further utilize a transition metal-based oxidation catalyst selected from a cobalt, manganese, copper, chromium, zinc, iron, or nickel compound. The transition metal-based oxidation catalyst may be present in the form of a metal salt. In this case, suitable counter ions for the transition metal include, but are not limited to, carboxylates, such as neo-decanoates, octanoates, stearates, acetates, naphthalates, lactates, maleates, acetylacetonates, linoleates, oleates, palmitates or 2-ethyl hexanoates, oxides, carbonates, chlorides, dioxides, hydroxides, nitrates, phosphates, sulfates, silicates or mixtures thereof. It is particularly advantageous to utilize a cobalt-based oxidation catalyst. Examples include cobalt carboxylates and sulfonates.

In some embodiments, the weight ratio of the transition metal-based oxidation catalyst to the titanium compound, on the basis of the weight of the transition metal and the titanium, is from 50:1 to 1:1. Optionally, the ratio is from 25:1 to 1:1, 10:1 to 1:1, 5:1 to 1:1 or 2:1 to 1:1.

Advantageously, the titanium compound is present in an amount of about 5 to about 20 ppm, more specifically about 5 to about 15 ppm, and in particular about 5 to about 10 ppm, on basis of the weight of titanium in the total composition, and that the transition metal based oxidation catalyst is present in an amount of 30 to 200 ppm, more specifically about 50 to about 150 ppm, and in particular about 75 to about 125 ppm, on basis of the weight of the transition metal in the total composition.

It may be particularly advantageous that titanium compound is a polycondensation and/or transesterification catalyst.

Advantageously, the polyether segments in the copolyester-ether have a number-average molecular weight of from about 600 to about 2500 g/mol, in particular about 800 to about 1600 g/mol, that the polyether segment is a linear or branched poly ($C_2$-$C_6$-alkylene glycol) segment, that the transition metal-based oxidation catalyst is a cobalt compound, that the titanium compound is present in an amount of about 5 to about 20 ppm, on basis of the weight of the titanium in the total composition, and that the transition metal based oxidation catalyst is present in an amount of about 30 to about 200 ppm, on basis of the weight of the transition metal in the total composition.

Advantageously, the polyether segments in the copolyester-ether have a number-average molecular weight of from about 600 to about 2500 g/mol, in particular about 800 to about 1600 g/mol, that the polyether segment is a linear or branched poly ($C_2$-$C_6$-alkylene glycol) segment, that the transition metal-based oxidation catalyst is a cobalt compound, that the titanium compound is a polycondensation and/or transesterification catalyst, that the titanium compound is present in an amount of about 5 to about 20 ppm, in particular about 7 to about 15 ppm, on basis of the weight of titanium in the total composition, and that the transition metal based oxidation catalyst is present in an amount of about 30 to about 200 ppm, in particular 50 to about 150 ppm, on basis of the weight of the transition metal in the total composition.

In the kit-of-parts embodiments of the present invention, it may be advantageous that the kit-of-parts is packaged for storage. In the kit-of-parts embodiments of the present invention, it may be advantageous that the polyester is a polyethylene terephthalate (co)polyester. In the kit-of-parts embodiments of the present invention, it may be advantageous that the copolyester-ether comprises one or more polyether segments having a number-average molecular weight of from about 200 to about 5000 g/mol and is a linear or branched poly ($C_2$-$C_6$-alkylene glycol) segment.

In the kit-of-parts embodiments of the present invention, it may be advantageous that in the first masterbatch the transition metal based oxidation catalyst is present in an amount of about 500 to about 15000 ppm, in particular about 750 to about 10000 ppm, or about 1000 to about 5000 ppm, on basis of the weight of the transition metal in first masterbatch. In the kit-of-parts embodiments of the present invention, it may be advantageous that the weight ratio of the transition metal-based oxidation catalyst to the titanium compound present in the first masterbatch, on basis of the weight of the transition metal and the titanium, is from 5:1 to about 500:1, more specifically about 7:1 to about 400:1, in particular about 10:1 to about 250:1 or about 20:1 to about 150:1.

In the kit-of-parts embodiments of the present invention, it may be particularly advantageous that transition metal-based oxidation catalyst is a cobalt compound that is present in an amount of about 500 to about 15000 ppm, in particular about 750 to about 10000 ppm, more specifically about 1000 to about 5000 ppm, on basis of the weight of cobalt in the first masterbatch and that the titanium compound is present in an amount of about 5 to about 500 ppm, in particular about 7 to about 300 ppm, more specifically about 10 to about 200 ppm, even more specifically about 20 to about 150 ppm, or about 50 to about 100 ppm, on basis of the weight of the titanium in the first masterbatch.

In the kit-of-parts embodiments of the present invention, it may be advantageous that the second masterbatch comprises a titanium compound, e.g. in the form of a polycondensation and/or transesterification catalyst. In some embodiments, this may reduce unwanted side-products.

Embodiments in some aspects of the invention may further comprise an antioxidant, in particular one selected from the group consisting of hindered amine light stabilizers (HALS), hindered phenols, benzophenones, sulfur-based antioxidants, and phosphites. Examples of such antioxidants include, but are not limited to 1,3,5-trimethyl-2,4,6-tris(3, 5-di-tert-butyl-4-hydroxybenzyl)-benzene (CAS: 1709-70-2), tetrakis(2,4-di-tert-butylphenyl)-1,1-biphenyl-4,4'-diyl-bisphosphonite (CAS: 38613-77-3) or pentaerythritol tetrakis(3-(3,5-di-tert-butyl-4-hydroxyphenyl)propionate (CAS: 6683-19-8). Advantageously, one or more antioxidants are used in a total amount of about 100 ppm to about 10,000 ppm, more specifically about 200 ppm to about 5,000 ppm or about 300 ppm to about 3,000 ppm, and in particular about 500 ppm to about 2,500 ppm, on basis of the total weight of the antioxidant to the total weight of the composition.

Embodiments in some aspects of the invention may further comprise additives selected from the group consisting of dyes, pigments, fillers, branching agents, reheat agents, anti-blocking agents, anti-static agents, biocides, blowing agents, coupling agents, flame retardants, heat stabilizers, impact modifiers, crystallization aids, lubricants, plasticizers, processing aids, buffers, and slip agents. Representative examples of such additives are well-known to the skilled person.

It may be advantageous that an ionic compatibilizer is present or used. Suitable ionic compatibilizers can for instance be copolyesters prepared by using ionic monomer units as disclosed in WO 2011/031929 A2, page 5, incorporated herein by reference.

The disclosed compositions, kit-of-parts and methods may be used for preparing various articles of manufacture. Suitable articles include, but are not limited to, film, sheet, tubing, pipes, fiber, container preforms, blow molded articles such as rigid containers, thermoformed articles, flexible bags and the like and combinations thereof. Typical rigid or semi-rigid articles can be formed from plastic, paper or cardboard cartons or bottles such as juice, milk, soft drink, beer and soup containers, thermoformed trays or cups. In addition, the walls of such articles may comprise multiple layers of materials.

Third Aspect

The composition for preparing an article, preform or container comprises 80-99.5 parts by weight of a base polyester, including 85-99.5, 90-99.5, or 95-99.5 parts by weight of the base polyester. Preferably, the composition comprises 90-99.5 parts by weight of the base polyester.

Generally, copolyester-ethers suitable for the present invention comprise one or more polyester segments and one or more polyether segments having a number-average molecular weight of from about 200 to about 5000 g/mol. Advantageously, the copolyester-ether has a number-average molecular weight of from about 600 to about 2500 g/mol, more specifically about 800 to about 1800 g/mol or about 1000 to about 1600 g/mol.

The one or more polyether segments may advantageously be present in an amount of about 5 to about 45 wt.-% or about 15 to about 45 wt.-% of the copolyester-ether. Advantageously, the polyether segments are present in an amount of about 10 to about 40 wt.-%, more specifically about 20 to about 40 wt.-%, or in particular about 25 to about 35 wt.-% or about 25 to about 30 wt.-%, in all cases based on the copolyester-ether.

Generally, copolyester-ethers suitable for the present invention comprise one or more polyether segments in amounts so that the weight ratio of the one or more polyether segments to the total amount of base polyester and polyester segments in the composition is about 0.2 to about 10 wt.-%, more specifically about 0.5 to about 10 wt.-%, or in particular about 0.7 to about 5 wt.-%, or about 0.5 to about 1.5 wt.-%, or about 1 to about 2.5 wt.-%.

Advantageously, the polyether segment is a poly ($C_2$-$C_6$-alkylene glycol) segment. The $C_2$-$C_6$-alkylene glycol may be a linear or branched aliphatic $C_2$-$C_6$-moiety. Specific examples of such copolyester-ethers include poly(ethylene glycol), linear or branched poly(propylene glycol), linear or branched poly(butylene glycol) glycol, linear or branched poly(pentylene glycol), linear or branched poly(hexylene glycol) as well as mixed poly ($C_2$-$C_6$-alkylene glycols) obtained from two or more of the glycolic monomers used in preparing the before-mentioned examples. Advantageously, the polyether segment is a linear or branched poly(propylene glycol) or a linear or branched poly(butylene glycol).

The copolyester-ethers suitable for the present invention also comprise one or more polyester segments. The type of polyester in these segments is not particularly limited and can be any of the above-referenced polyesters. Advantageously, the copolyester-ether comprises a polyethylene terephthalate (co)polymer segment. Advantageously, the copolyester-ether comprises a polyethylene terephthalate (co)polymer segment and a linear or branched poly(butylene glycol) segment.

The composition for preparing an article, preform or container comprises 0.5-20 parts by weight of a copolyester-ether, in particular 0.5-15, 0.5-10, or 0.5-5 parts by weight of the copolyester-ether. Preferably, the composition comprises 1-5 parts by weight of the copolyester-ether.

Methods of preparing polyethers and copolyester-ethers are well known in the art. For example, the copolyester-ether can be produced by ester interchange with the dialkyl ester of a dicarboxylic acid. In the ester interchange process dialkyl esters of dicarboxylic acids undergo transesterification with one or more glycols in the presence of a catalyst such as zinc acetate as described in WO 2010/096459 A2, incorporated herein by reference. A suitable amount of elemental zinc in the copolyester-ether can be about 35 to about 100 ppm, for example about 40 to about 80 ppm, by weight of the copolyester-ether. The poly(alkylene oxide) glycols replace part of these glycols in these transesterification processes. The poly(alkylene oxide) glycols can be added with the starting raw materials or added after transesterification. In either case, the monomer and oligomer mixture can be produced continuously in a series of one or more reactors operating at elevated temperature and pressures at one atmosphere or lesser. Alternatively, the monomer and oligomer mixture can be produced in one or more batch reactors. Suitable conditions for these reactions are temperatures of from about 180° C. to 250° C. and pressures of from about 1 bar to 4 bar.

Next, the mixture of copolyester-ether monomer and oligomers undergoes melt-phase polycondensation to produce a polymer. The polymer is produced in a series of one or more reactors operating at elevated temperatures. To facilitate removal of excess glycols, water, and other reaction products, the polycondensation reactors are run under a vacuum. Catalysts for the polycondensation reaction include compounds of antimony, germanium, tin, titanium and/or aluminum. In some embodiments, it may be advantageous to use a titanium compound. A suitable amount of elemental Ti can be about 5 to about 60 ppm, for example about 10 to 35 ppm. Reaction conditions for polycondensation can include (i) a temperature less than about 290° C., or about 10° C. higher than the melting point of the copolyester-ether; and (ii) a pressure of less than about 0.01 bar, decreasing as polymerization proceeds. This copolyester-ether can be produced continuously in a series of one or more reactors operating at elevated temperature and pressures less than one atmosphere. Alternatively this copolyester-ether can be produced in one or more batch reactors. The intrinsic viscosity after melt phase polymerization can be in the range of about 0.5 dl/g to about 1.5 dl/g. Antioxidants and other additives can be added before and/or during polymerization to control the degradation of the polyester-ether segments. Alternatively, the copolyester-ethers can be produced by reactive extrusion of the polyether with the polyester. In the above-described methods of preparing the copolyester-ethers, it may happen that the polyether does not fully react with the polyester but is partly present as an intimate blend of the polyester and polyether. Therefore, throughout the specification and embodiments, the reference to a copolyester-ether comprising one or more polyester segments and one or more polyether segments is to be understood as referring to the respective copolyester-ethers, blends of respective polyesters and polyethers, and mixtures comprising both the respective copolyester-ethers and blends of the respective polyesters and polyethers.

The copolyester-ether is preferably used in amounts of about 0.5 to about 20 wt.-% in relation to the final composition. Advantageously, the amount of the copolyester-ether is selected within the range of about 0.5 to about 20 wt.-%, in relation to the final container, preform and article composition, so that the amount of polyether segments to the total amount of base polyester and polyester segments in the composition is about 0.2 to about 10 wt.-%, more specifically about 0.5 to about 10 wt.-%, or in particular about 0.7 to about 5 wt.-%, or about 0.5 to about 1.5 wt.-%, or about 1 to about 2.5 wt.-%.

It is particularly advantageous that the copolyester-ether contains one or more polyether segments in an amount of about 5 to about 45 wt.-%, in particular about 15 to about 35 wt.-%, more specifically about 20 to about 30 wt.-%, and that the amount of the copolyester-ether is selected so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

It is particularly advantageous that the polyether segments in the copolyester-ether have a number-average molecular weight of from about 600 to about 2500 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 40 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

Advantageously, the polyether segments in the copolyester-ether are selected from a linear or branched poly(propylene glycol) or a linear or branched poly(butylene glycol) having a number-average molecular weight of from about 600 to about 2500 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

Advantageously, the copolyester-ether and/or the polyester is produced using a titanium-based polycondensation and/or transesterification catalyst. In particular, it may be advantageous that the polyester is produced using a titanium-based polycondensation catalyst.

The compositions, masterbatches and processes of the invention further utilize a transition metal-based oxidation catalyst selected from a cobalt, manganese, copper, chromium, zinc, iron, or nickel compound. The transition metal-based oxidation catalyst may be present in the form of a metal salt. In this case, suitable counter ions for the transition metal include, but are not limited to, carboxylates, such as neodecanoates, octanoates, stearates, acetates, naphthalates, lactates, maleates, acetylacetonates, linoleates, oleates, palminates or 2-ethyl hexanoates, oxides, borides, carbonates, chlorides, dioxides, hydroxides, nitrates, phosphates, sulfates, silicates or mixtures thereof. It is particularly advantageous to utilize a cobalt-based oxidation catalyst. Examples include cobalt carboxylates and sulfonates.

Advantageously, the titanium compound is present in an amount of about 5 to about 20 ppm, more specifically about 5 to about 15 ppm, and in particular about 5 to about 10 ppm, on basis of the weight of titanium in the total composition, and that the transition metal based oxidation catalyst is present in an amount of 30 to 200 ppm, more specifically about 50 to about 150 ppm, and in particular about 75 to about 125 ppm, on basis of the weight of the transition metal in the total composition.

It may be particularly advantageous that titanium compound is a polycondensation and/or transesterification catalyst.

Advantageously, the polyether segments in the copolyester-ether have a number-average molecular weight of from about 600 to about 2500 g/mol, in particular about 800 to about 1600 g/mol, that the polyether segment is a linear or branched poly ($C_2$-$C_6$-alkylene glycol) segment, that the polyether segments are present in the copolyester-ether in an amount of about 10 to about 40 wt.-%, in particular about 20 to about 35 wt.-%, that the transition metal-based oxidation catalyst is a cobalt compound, and that the transition metal based oxidation catalyst is present in an amount of about 30 to about 300 ppm, on basis of the weight of the transition metal in the total composition.

Advantageously, the polyether segments in the copolyester-ether have a number-average molecular weight of from about 600 to about 2500 g/mol, in particular about 800 to about 1600 g/mol, that the polyether segment is a linear or branched poly ($C_2$-$C_6$-alkylene glycol) segment, that the polyether segments are present in the copolyester-ether in an amount of about 10 to about 40 wt.-%, in particular about 20 to about 35 wt.-%, that the transition metal-based oxidation catalyst is a cobalt compound, and that the transition metal based oxidation catalyst is present in an amount of about 30 to about 200 ppm, in particular 50 to 150 ppm, on basis of the weight of the transition metal in the total composition.

In the kit-of-parts embodiments of the present invention, it may be advantageous that the kit-of-parts is packaged for storage. In the kit-of-parts embodiments of the present invention, it may be advantageous that the polyester is a polyethylene terephthalate (co)polyester. In the kit-of-parts embodiments of the present invention, it may be advantageous that the copolyester-ether comprises one or more polyether segments having a number-average molecular weight of from about 600 to about 2500 g/mol and are linear or branched poly ($C_2$-$C_6$-alkylene glycol) segments.

In the kit-of-parts embodiments of the present invention, it may be advantageous that in the first masterbatch the transition metal based oxidation catalyst is present in an amount of about 500 to about 15000 ppm, in particular about 750 to about 10000 ppm, or about 1000 to 5000 ppm on basis of the weight of the transition metal in first masterbatch. In the kit-of-parts embodiments of the present invention, it may be advantageous that the weight ratio of the transition metal-based oxidation catalyst to the titanium compound present in the first masterbatch, on basis of the weight of the transition metal and the titanium, is from about 5:1 to about 500:1, more specifically about 7:1 to 400:1, in particular about 10:1 to 250:1 or about 20:1 to about 150:1.

In the kit-of-parts embodiments of the present invention, it may be particularly advantageous that transition metal-based oxidation catalyst is a cobalt compound that is present in an amount of about 500 to about 15000 ppm, in particular about 750 to about 10000 ppm, more specifically about 1000 to about 5000 ppm on basis of the weight of cobalt in the first masterbatch, and that the titanium compound is present in an amount of about 5 to about 500 ppm, in particular about 7 to about 300 ppm, more specifically about 10 to about 200 ppm, even more specifically about 20 to about 150 ppm, or about 50 to about 100 ppm, on basis of the weight of the titanium in the first masterbatch.

In the kit-of-parts embodiments of the present invention, it may be advantageous that the second masterbatch comprises a titanium compound, e.g. in the form of a polycondensation and/or transesterification catalyst. In some embodiments, this may reduce unwanted side-products.

Embodiments in some aspects of the invention may further comprise an antioxidant selected from the group consisting of hindered amine light stabilizers (HALS), hindered phenols, benzophenones, sulfur-based antioxidants, and phosphites. Examples of such antioxidants include, but are not limited to 1,3,5-trimethyl-2,4,6-tris(3,5-di-tert-butyl-4-hydroxybenzyl)-benzene (CAS: 1709-70-2), tetrakis(2,4-di-tert-butylphenyl)-1,1-biphenyl-4,4'-diylbisphosphonite (CAS: 38613-77-3) or pentaerythritol tetrakis(3-(3,5-di-tertbutyl-4-hydroxyphenyl)propionate (CAS: 6683-19-8 Advantageously, one or more antioxidants are used in a total amount of about 100 ppm to about 10,000 ppm, more specifically about 200 ppm to about 5,000 ppm or about 300 ppm to about 3,000 ppm, and in particular about 500 ppm to about 2,500 ppm, on basis of the total weight of the antioxidant to the total weight of the composition Embodiments in some aspects of the invention may further comprise additives selected from the group consisting of dyes, pigments, fillers, branching agents, reheat agents, anti-blocking agents, anti-static agents, biocides, blowing agents, coupling agents, flame retardants, heat stabilizers, impact modifiers, crystallization aids, lubricants, plasticizers, processing aids, buffers, and slip agents. Representative examples of such additives are well-known to the skilled person.

It may be advantageous that an ionic compatibilizer is present or used. Suitable ionic compatibilizers can for instance be copolyesters prepared by using ionic monomer units as disclosed in WO 23011/031929 A2, page 5, incorporated herein by reference.

The disclosed compositions, masterbatches and methods may be used for preparing articles of manufacture. Suitable articles include, but are not limited to, film, sheet, tubing, pipes, fiber, container preforms, blow molded articles such as rigid containers, thermoformed articles, flexible bags and the like and combinations thereof. Typical rigid or semi-rigid articles can be formed from plastic, paper or cardboard cartons or bottles such as juice, milk, soft drink, beer and soup containers, thermoformed trays or cups. In addition, the walls of such articles may comprise multiple layers of materials.

Fourth Aspect

Advantageously, the polyester is a polyethylene terephthalate or a copolymer thereof having a melting point, determined according to ASTM D 3418-97, of about 240° C. to about 250° C., in particular about 242° C. to about 250° C., and especially about 245° C. to about 250° C.

Advantageously, the polyester used in preparing the articles of the present invention has an intrinsic viscosity, measured according to the method described in the Test Procedures below, of about 0.6 dl/g to about 1.1 dl/g, in particular about 0.65 dl/g to about 0.95 dl/g.

The composition for preparing an article, preform or container comprises 80-99.5 parts by weight of a base polyester, including 85-99.5, 90-99.5, or 95-99.5 parts by weight of the base polyester. Preferably, the composition comprises 90-99.5 parts by weight of the base polyester.

Copolyester-ethers suitable for the present invention comprise one or more polyester segments and one or more polyether segments having a number-average molecular weight of from about 200 to about 5000 g/mol. Advantageously, the copolyester-ether has a number-average molecular weight of from about 600 to about 2500 g/mol, more specifically from about 800 to about 1800 g/mol or from about 1000 to about 1600 g/mol. The copolyester-ethers are present in the composition in an amount from 0.5-20 parts by weight, including 0.5-15 parts by weight, 0.5-10 parts by weight, and 0.5-5 parts by weight. Preferably, the composition comprises 0.5-10 parts by weight of the copolyester-ethers.

The one or more polyether segments are present in an amount of about 5 to about 45 wt.-% of the copolyester-ether. Advantageously, the polyether segments are present in an amount of about 15 to about 45 wt.-%, or about 10 to about 40 wt.-%, more specifically about 20 to about 40 wt.-%, or in particular about 25 to about 35 wt.-% or about 25 to about 30 wt.-%, in all cases based on the copolyester-ether.

Generally, copolyester-ethers suitable for the present invention comprise one or more polyether segments in amounts so that the weight ratio of the one or more polyether segments to the total amount of base polyester and polyester segments in the composition is about 0.2 to about 10 wt.-%, more specifically about 0.5 to about 5 wt.-%, or in particular about 0.7 to about 5 wt.-%, or about 0.5 to about 1.5 wt.-%, or about 1 to about 2.5 wt.-%.

Advantageously, the polyether segment is a poly ($C_2$-$C_6$-alkylene glycol) segment. The $C_2$-$C_6$-alkylene glycol may be a linear or branched aliphatic $C_2$-$C_6$-moiety. Specific examples of such copolyester-ethers include poly(ethylene glycol), linear or branched poly(propylene glycol), linear or branched poly(butylene glycol), linear or branched poly (pentylene glycol), linear or branched poly(hexylene glycol) as well as mixed poly ($C_2$-$C_6$-alkylene glycols) obtained from two or more of the glycolic monomers used in preparing the before-mentioned examples. Advantageously, the polyether segment may be a linear or branched poly(propylene glycol) or a linear or branched poly(butylene glycol).

The copolyester-ethers suitable for the present invention also comprise one or more polyester segments. The type of polyester in these segments is not particularly limited and can be any of the above-referenced polyesters. Advantageously, the copolyester-ether comprises a polyethylene terephthalate (co)polymer segment. Advantageously, the copolyester-ether may comprise a polyethylene terephthalate (co)polymer segment and a linear or branched poly (butylene glycol) segment.

Furthermore, the melting point difference, determined according to ASTM D 3418-97, between the polyester and the copolyester-ether is less than about 15° C. Advantageously, the melting point difference is less than about 10° C., more specifically less than about 8° C. or less than about 5° C. Advantageously, the melting point, determined according to ASTM D 3418-97, of the polyester is about 240° C. to about 250° C. and that of the copolyester-ether is about 225° C. to about 250° C., in particular about 230° C. to about 250° C., especially about 232° C. to about 250° C. or about 240° C. to about 250° C. The melting points of the copolyester-ether and polyester may be determined for the starting materials or in the final composition.

Methods of preparing polyethers and copolyester-ethers are well known in the art. For example, the copolyester-ether can be produced by ester interchange with the dialkyl ester of a dicarboxylic acid. In the ester interchange process dialkyl esters of dicarboxylic acids undergo transesterification with one or more glycols in the presence of a catalyst such as zinc acetate as described in WO 2010/096459 A2, incorporated herein by reference. A suitable amount of elemental zinc in the copolyester-ether can be about 35 to about 100 ppm, for example about 40 to about 80 ppm, by weight of the copolyester-ether. The poly(alkylene oxide) glycols replace part of these glycols in these transesterification processes. The poly(alkylene oxide) glycols can be added with the starting raw materials or added after transesterification. In either case, the monomer and oligomer mixture can be produced continuously in a series of one or more reactors operating at elevated temperature and pressures at one atmosphere or lesser. Alternatively, the monomer and oligomer mixture can be produced in one or more batch reactors. Suitable conditions for these reactions are temperatures of from about 180° C. to 250° C. and pressures of from about 1 bar to 4 bar.

Next, the mixture of copolyester-ether monomer and oligomers undergoes melt-phase polycondensation to produce a polymer. The polymer is produced in a series of one or more reactors operating at elevated temperatures. To facilitate removal of excess glycols, water, and other reaction products, the polycondensation reactors are run under a vacuum. Catalysts for the polycondensation reaction include compounds of antimony, germanium, tin, titanium and/or aluminum. In some embodiments, it may be advantageous to use a titanium compound. A suitable amount of elemental Ti can be about 5 to about 60 ppm, for example about 10 to 35 ppm. Reaction conditions for polycondensation can include (i) a temperature less than about 290° C., or about 10° C. higher than the melting point of the copolyester-ether; and (ii) a pressure of less than about 0.01 bar, decreasing as polymerization proceeds. This copolyester-ether can be produced continuously in a series of one or more reactors operating at elevated temperature and pressures less than one atmosphere. Alternatively this copolyester-ether can be produced in one or more batch reactors. The intrinsic viscosity after melt phase polymerization can be in the range of about 0.5 dl/g to about 1.5 dl/g. Antioxidants and other additives can be added before and/or during polymerization to control the degradation of the polyester-ether segments. Alternatively, the copolyester-ethers can be produced by reactive extrusion of the polyether with the polyester. In the above-described methods of preparing the copolyester-ethers, it may happen that the polyether does not fully react with the polyester but is partly present as an intimate blend of the polyester and polyether. Therefore, throughout the specification and embodiments, the reference to a copolyester-ether comprising one or more polyester segments and one or more polyether segments is to be understood as referring to the respective copolyester-ethers, blends of respective polyesters and polyethers, and mixtures comprising both the respective copolyester-ethers and blends of the respective polyesters and polyethers.

The melting point of the copolyester-ether can be conveniently controlled by adjusting various characteristics or parameters of the polymer composition, as known to those skilled in the art. For instance, one skilled in the art may opt to suitably select the molecular weight of the polyether segment, and/or the weight ratio of polyester segment to polyether segment to adjust the melting point. It is also possible to select different types of polyester to adjust the melting point. For example, aromatic polyesters are known to have higher melting points than aliphatic polyesters. Thus, one skilled in the art may select or mix suitable polyesters to reliably adjust the melting point of the copolyester-ether. Other options include suitably selecting the type of polyether. For instance, the chain length and the presence or absence of a side chain influences the melting point of the copolyester-ether. A further possibility is the addition of additives.

The copolyester-ether is preferably used in amounts of about 0.5 to about 20 wt.-% in relation to the final composition. Advantageously, the amount of the copolyester-ether is selected within the range of about 0.5 to about 10 wt.-%, in relation to the final composition, so that the amount of polyether segments to the total amount of base polyester and polyester segments in the composition is about 0.2 to about 10 wt.-%, more specifically about 0.5 to about 10 wt.-%, or in particular about 0.7 to about 5 wt.-%, or about 0.5 to about 1.5 wt.-%, or about 1 to about 2.5 wt.-%.

It is particularly advantageous that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to about 1.5 wt.-%, or about 1 to about 2.5 wt.-%.

It is particularly advantageous that the polyether segments in the copolyester-ether have a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or about 0.5 to 1.5 wt.-%, or about 1 to about 2.5 wt.-%.

It is particularly advantageous that the polyether segments in the copolyester-ether are selected from a linear or branched poly(propylene glycol) or a linear or branched poly(butylene glycol) having a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, and that the amount of the copolyester-ether is selected within the range of about 0.5 to about 20 wt.-%, in relation to the final composition, so that the amount of polyether segments to the total amount of base polyester and polyester segments in the composition is about 0.5 to about 10 wt.-%, in particular about 0.7 to about 5 wt.-%, or 0.5 to 1.5 wt.-%, or about 1 to about 2.5 wt.-%.

It is particularly advantageous that the polyether segments in the copolyester-ether are selected from a linear or branched poly(propylene glycol) or a linear or branched poly(butylene glycol) having a number-average molecular weight of from about 600 to about 2000 g/mol, in particular about 800 to about 1600 g/mol, that the copolyester-ether contains one or more polyether segments in an amount of about 15 to about 35 wt.-%, in particular about 20 to about 30 wt.-%, that the amount of the copolyester-ether is selected within the range of about 0.5 to about 20 wt.-%, in relation to the final composition, so that the amount of polyether segments to the total amount of base polyester and polyester segments in the composition is about 0.7 to about 5 wt.-%, or about 0.5 to about 1.5 wt.-%, in particular about 1 to about 2.5 wt.-%, and that the melting point, determined according to ASTM D 3418-97, of the copolyester-ether is about 225° C. to about 250° C., especially about 235° C. to about 250° C., or in particular about 240° C. to about 250° C.

Where the invention may further comprise a transition metal-based oxidation catalyst, suitable oxidation catalysts include those transition metal catalysts that activate or promote the oxidation of the copolyester-ether by ambient oxygen. Examples of suitable transition metals may include compounds comprising cobalt, manganese, copper, chromium, zinc, iron, or nickel. The transition metal-based oxidation catalyst may be present in the form of a metal salt. In this case, suitable counter ions for the transition metal include, but are not limited to, carboxylates, such as neodecanoates, octanoates, stearates, acetates, naphthalates, lactates, maleates, acetylacetonates, linoleates, oleates, palminates or 2-ethyl hexanoates, oxides, carbonates, chlorides, dioxides, hydroxides, nitrates, phosphates, sulfates, silicates or mixtures thereof. It is also possible that the transition metal-based oxidation catalyst is incorporated in the polymer matrix during e.g. extrusion. The transition metal-based oxidation catalyst can be added during polymerization of the polyester or compounded into a suitable polyester thereby forming a polyester-based masterbatch that can be added during the preparation of the article. Advantageously, the transition metal based oxidation catalyst is a cobalt compound. In the container- or preform-related embodiments of the present invention, it may be advantageous that the transition metal-based oxidation catalyst is a cobalt compound that is present in an amount of 30-200 ppm, more specifically 60-120 ppm, on basis of the weight of cobalt atom in the total composition. In the masterbatch-related embodiments of the present invention, it may be advantageous that the transition metal-based oxidation catalyst is a cobalt compound that is present in an amount of 50-5,000 ppm, more specifically 100-2,500 ppm, on basis of the weight of cobalt in the total composition. In the embodiments of the present invention, it may be advantageous that the transition metal-based oxidation catalyst is supplied as a cobalt salt, in particular a cobalt carboxylate, and especially a cobalt $C_8$-$C_{20}$ carboxylate. The cobalt compound may be physically separate from the copolyester-ether, for example a sheath core or side-by-side relationship, so as not to activate the copolyester-ether prior to melt blending into a preform or bottle.

Embodiments in some aspects of the invention may further comprise an antioxidant selected from the group consisting of hindered phenols, benzophenones, sulfur-based antioxidants, phosphites and hindered amine light stabilizers. Examples of such antioxidants include, but are not limited to 1,3,5-trimethyl-2,4,6-tris(3,5-di-tert-butyl-4-hydroxybenzyl)-benzene (CAS: 1709-70-2), tetrakis(2,4-di-tert-butylphenyl)-1,1-biphenyl-4,4'-diylbisphosphonite (CAS: 38613-77-3) and pentaerythritol tetrakis(3-(3,5-di-tert-butyl-4-hydroxy-phenyl)propionate (CAS: 6683-19-8). Advantageously, one or more antioxidants are used in a total amount of 40 ppm-10,000 ppm, more specifically 80 ppm-5,000 ppm or 120 ppm-3,000 ppm, and in particular 150 ppm-2,000 ppm, on basis of the total weight of the one or more antioxidants to the total weight of the composition.

Embodiments in some aspects of the invention may further comprise additives selected from the group consisting of dyes, pigments, fillers, branching agents, reheat agents, anti-blocking agents, anti-static agents, biocides, blowing agents, coupling agents, flame retardants, heat stabilizers, impact modifiers, crystallization aids, lubricants, plasticizers, processing aids, buffers, and slip agents. Representative examples of such additives are well-known to the skilled person.

It may be advantageous that an ionic compatibilizer is present or used. Suitable ionic compatibilizers can for instance be copolyesters prepared by using ionic monomer units as disclosed in WO 2011/031929 A2, page 5, incorporated herein by reference.

One aspect of the invention refers to the use of copolyester-ether, wherein the copolyester-ether comprises one or more polyether segments having a number-average molecular weight of from 200 to 5000 g/mol, wherein the one or more polyether segments are present in the copolyester-ether in an amount of about 5 to about 45 wt.-%, and wherein the melting point of the copolyester-ether, determined according to ASTM D 3418-97, is from 225° C. and 250° C.; for preparing a kit-of-parts comprising said copolyester-ether and physical or electronic instructions or advise to use said copolyester-ether for preparing a preform or container. A non-limiting example of such a kit-of-parts is a package comprising the copolyester-ether that is containing or accompanied by a shipping document that specifies that the contents of the package are intended for use in preforms or containers. A further non-limiting example of such a kit-of-part is a package or storage form comprising the copolyester-ether and a webpage stating that the copolyester-ether is available for sale for use in preforms or containers.

In masterbatch embodiments of the present invention, it may be advantageous that the masterbatch is mixed or packaged with another masterbatch comprising the transition metal based oxidation catalyst (a "salt and pepper" mixture). It may be advantageous that the other masterbatch comprising the transition metal based oxidation catalyst further comprises a polyester.

The disclosed compositions, masterbatches and methods may be used for preparing articles of manufacture. Suitable articles include, but are not limited to, film, sheet, tubing, pipes, fiber, container preforms, blow molded articles such as rigid containers, thermoformed articles, flexible bags and the like and combinations thereof. Typical rigid or semi-rigid articles can be formed from plastic, paper or cardboard cartons or bottles such as juice, milk, soft drink, beer and soup containers, thermoformed trays or cups. In addition, the walls of such articles may comprise multiple layers of materials.

The term "comprising" encompasses "including" as well as "consisting" e.g. a composition "comprising" X may consist exclusively of X or may include something additional e.g. X+Y.

The invention is further illustrated by the following examples, although it will be understood that these examples are included for the purposes of illustration only and are not intended to limit the scope of the invention.

Test Procedures

Number Average Molecular Weight

The number average molecular weight of the polyols is determined by the titration method for the hydroxyl number of the polyols. Similar ASTM methods are ASTM E222 A and ASTM E222B, herein incorporated by reference.

For that 1 h of polyglycol, whereas the actual weight is dependent on the expected hydroxyl number—(expected to be 50/hydroxyl number), was added into a 100 mL beaker 15 mL of dry tetrahydrofuran and the sample dissolved using a magnetic stirrer. 10 mL of p-toluenesulfonyl isocyanate in 250 mL anhydrous acetonitrile was then added to the solution. The solution was then stirred for five minutes after 1 mL of water was added.

Then the solution was diluted to 60 mL with tetrahydrofuran and titrated with 0.1 N tetrabutyl ammonium hydroxide (TBAOH) using an automatic titrator. (TBAOH titrant: 100 mL 1M TBAOH/MeOH in 1000 mL isopropanol. Standardize against potassium biphthalate or benzoic acid standards. Restandardize every time the electrode is recalibrated.)

The hydroxyl number of the polyol was calculated as followed:

$$\text{Hydroxyl number (OH\#)} = \frac{(V2 - V1) \cdot N \cdot 56.1}{\text{sample weight}}$$

wherein
V1=Titrant volume at first equivalence point (low pH)
V2=Titrant volume at second equivalence point (higher oH)
N=Normality of TBAOH The number molecular weight of the polyol is then calculated as followed:

$$\text{Molecular weight (number average)} = \frac{112200}{\text{Hydroxyl number (OH\#)}} \left[\frac{g}{mol}\right]$$

Intrinsic Viscosity

The determination of the intrinsic viscosity was determined on a 0.01 g/mL polymer solution in dichloroacetic acid.

Before dissolution of solid state polymerized material, the chips were pressed in a hydraulic press (pressure: 400 kN at 115° C. for about 1 minute; type: PW40® Weber, Remshalden-Grunbach, Germany). 480 to 500 mg polymer, either amorphous chips or pressed chips, were weighed on an analytical balance (Mettler AT 400®) and dichloroacetic acid is added (via Dosimat® 665 or 776 from Metrohm) in such an amount, that a final polymer concentration of 0.0100 g/mL is reached.

The polymer is dissolved under agitation (magnetic stirring bar, thermostat with set point of 65° C.; Variomag Thermomodul 40 ST®) at 55° C. (internal temperature) for 2.0 hrs. After complete dissolution of the polymer, the solution is cooled down in an aluminum block for 10 to 15 minutes to 20° C. (thermostat with set point of 15° C.; Variomag Thermomodul 40 ST®).

The viscosity measurement was performed with the micro Ubbelohode viscometer from Schott (type 53820/II; Ø: 0.70 mm) in the Schott AVS 500® apparatus. The bath temperature is held at 25.00±0.05° C. (Schott Thermostat CK 101®). First the micro Ubbelohde viscometer is purged 4 times with pure dichloroacetic acid then the pure dichloroacetic acid is equilibrated for 2 minutes. The flow time of the pure solvent is measured 3 times. The solvent is drawn off and the viscometer is purged with the polymer solution 4 times. Before measurement, the polymer solution is equilibrated for 2 minutes and then the flow time of this solution is measured 3 times.

The relative viscosity (RV) is determined by dividing the flow time of the solution by the flow time of the pure solvent. RV is converted to IV using the equation: IV (dl/g)=[(RV−1)×0.691]+0.063.

Determination of the Thermal Decomposition Products Detected in the Preforms

The decomposition products detected in the chips and preforms were measured via Headspace-GCMS. For the measurements 1 g of a powdered sample (particle size <1.0 mm) and 2 µL hexafluorisopropanol (HFIP) as the internal standard were added in 20 g vials and then incubated for 1 hour at 150° C. 1 µL of the headspace of the vials was injected in the column (RTX-5, crossbond 5% diphenyl/95% dimethyl polysiloxane, 60 m, 0.25 mm internal diameter) for separation. The main thermal decomposition products were detected and analysed via mass spectrometer.

The following setup was used:
Gas Chromatograph (GC), Finnigan Focus GC (Thermo Electron Corporation)
   SSL inlet
      Mode: Split
      Inlet T—230° C.
      Split flow—63 mL·min$^{-1}$
      Spilt ratio—70
   Carrier
      Constant flow
      Ramp from 40° C. (hold for 8 min) to 300° C. (hold for 3 min)
      T increase 15° C.·min$^{-1}$
Mass Spectrometer (MS), Finnigan Focus DSQ (Thermo Electron Corporation)
   MS transfer line—T-250° C.
   Ion source T—200° C.
   Detector gain: 1.5·10$^5$ (multiplier voltage 1445V)
   Scan: 10-250 (mass range)

The following thermal decomposition products were detected in the headspace of the powdered samples:
   $C_2$-bodies—acetaldehyde
   $C_3$-bodies—formic acid propyl ester, propanol, propionaldehyde
   $C_4$-bodies—tetrahydrofuran The individual values for the above $C_2$- to $C_4$-bodies were summed up to give the reported value. The standard deviation of the thermal decomposition products is about 4% for all measurements.

Thermal Behavior

Melting temperature ($T_m$) was measured according to ASTM D 3418-97. A sample of about 10 mg was cut from various sections of the polymer chip and sealed in an aluminum pan. A scan rate of 10° C./min was used in a Netsch DSC204 instrument unit under a nitrogen atmosphere. The sample was heated from −30° C. to 300° C., held for 5 minutes and cooled to −30° C. at a scan rate of 10° C./min prior to the second heating cycle. The melting point ($T_m$) was determined as the melting peak temperature and was measured on the 2$^{nd}$ heating cycle where the 2$^{nd}$ heating cycle is the same as the first Haze and Color The color of the chips and preform or bottle walls was measured with a Hunter Lab ColorQuest II instrument. D65 illuminant was used with a CIE 1964 10° standard observer. The results are reported using the CIELAB color scale, L is a measure of brightness, a* is a measure of redness (+) or greenness (−) and b* is a measure of yellowness (+) or blueness (−).

The haze of the bottle walls was measured with the same instrument (Hunter Lab ColorQuest II instrument). D65 illuminant was used with a CIE 1964 10° standard observer. The haze is defined as the percent of the CIE Y diffuse transmittance to the CIE Y total transmission. Unless otherwise stated the % haze is measured on the sidewall of a stretch blow molded bottle having a thickness of about 0.25 mm.

Elemental Metal Content

The elemental metal content of the ground polymer samples was measured with an Atom Scan 16 ICP Emission Spectrograph from Spektro. 250 mg of the copolyester-ether was dissolved via microwave extraction by adding 2.5 mL sulfuric acid (95-97%) and 1.5 mL nitric acid (65%). The solution was cooled, then 1 mL hydrogen peroxide was added to complete the reaction and the solution was transferred into a 25 mL flask using distilled water. The supernatant liquid was analyzed. Comparison of the atomic emissions from the samples under analysis with those of solutions of known elemental ion concentrations was used to calculate the experimental values of elements retained in the polymer samples.

Oxygen Ingress Measurements—Non-Invasive Oxygen Determination (NIOD)

There are several methods available to determine the oxygen permeation, or transmission, into sealed packages such as bottles. In this case, non-invasive oxygen measurement systems (e.g., supplied by OxySense® and PreSens Precision Sensing) based on a fluorescence quenching method for sealed packages were employed. They consist of an optical system with an oxygen sensor spot (e.g. OxyDot®, which is a metal organic fluorescent dye immobilized in a gas permeable hydrophobic polymer) and a fiber optic reader-pen assembly which contains both a blue LED and photo-detector to measure the fluorescence lifetime characteristics of the oxygen sensor spot (e.g. OxyDot®).

The oxygen measurement technique is based upon the absorption of light in the blue region of the metal organic fluorescent dye of the oxygen sensor spot (e.g., OxyDot®), and fluorescence within the red region of the spectrum. The presence of oxygen quenches the fluorescent light from the dye as well as reducing its lifetime. These changes in the fluorescence emission intensity and lifetime are related to the oxygen partial pressure, and thus they can be calibrated to determine the corresponding oxygen concentration.

The oxygen level within a package such as a bottle can be measured by attaching an oxygen sensor spot (e.g., OxyDot®) inside the package. The oxygen sensor spot is then illuminated with a pulsed blue light from the LED of the fiber optic reader-pen assembly. The incident blue light is first absorbed by the dot and then a red fluorescence light is emitted. The red light is detected by a photo-detector and the characteristic of the fluorescence lifetime is measured. Different lifetime characteristics indicate different levels of oxygen within the package.

Experimental Method with PET Bottle at Ambient Conditions (23° C.)

A PreSens non-invasive and non-destructive oxygen ingress measurement equipment (Fibox 3-trace meter, fiber optic cable and trace oxygen sensor spots) was used to determine the oxygen permeability of the bottle at room temperature (23° C.). For a typical shelf-life test, the trace oxygen sensor spot was first attached onto the inner side wall of a 500 ml transparent PET bottle. The bottle was then filled with deionized and deoxygenated water containing $AgNO_3$ up to a headspace of approx. 20 ml, inside a nitrogen circulation glove box where the oxygen level of the water inside the bottle was stabilized at a level well below 50 ppb.

These bottles were then stored in a conditioning cabinet (Binder 23° C., 50% relative humidity) and the oxygen ingresses were monitored as a function of time using the PreSens oxygen ingress measurement equipment.

At a given time of measurements, an average value was first obtained from about 10 readings taken on the output of the trace oxygen spot for each bottle. This was then repeated for all the 5 bottles so as to achieve an overall averaged value for the oxygen ingress through the formulated cap and the wall of the bottle.

Oxygen measurements were made on day 0, 1, 2, 3, 8, 14, 21, 28, 42 and 56. The average oxygen ingress was determined and reported as ppb as follows:

$$\text{Oxygen ingress [ppb]} = \frac{\Sigma \text{ Oxygen ingress in the measurement of that day [ppb]}}{\text{Amount of measurements up to the day of measurement}^*}$$

*Including day 0

Preform and Bottle Process

Unless otherwise stated, the barrier copolyester-ether of the present invention was dryed for about 24 hours at 110-120° C. under nitrogen atmosphere, blended with the dry base resin (BP1) which contains the transition metal catalyst, melted and extruded into preforms. Each preform for a 0.5 liter soft drink bottle, for example, employed about 28 grams of the resin. The preform was then heated to about 85-120° C. and stretch-blown into a 0.5 liter contour bottle at a planar stretch ratio of approx. 8. The stretch ratio is the stretch in the radial direction times the stretch in the length (axial) direction. Thus if a preform is blown into a bottle, it may be stretched about two times in the axial direction and stretched up to about four times in the hoop direction giving a planar stretch ratio of up to eight (2×4). Since the bottle size is fixed, different preform sizes can be used for obtaining different stretch ratios. The sidewall thickness of the bottles was >0.25 mm.

Delamination Tests (Drop Impact Test)

Ten bottles (0.5 L) were made with from the barrier resin (copolyester-ether) and the base resin (polyester including oxidation additive) as described above. Each bottle was filled with 500 g water and capped securely. One at a time, each bottle was first dropped in an angle of 5° through a guide plate, then straight down from approx. 150 cm onto a steel plate. The guide plate ensured that the bottle reproducibly contacted the steel plate on their sidewall. Afterwards, the bottles were inspected and visually rated for their degree of delamination. The delamination was ranked as excellent if no delamination was visually detected or barely visible; as good if only some minor delamination detected; and as poor, if large areas of delamination of up to 2.5 cm were visible.

In second delamination test, twelve bottles (0.5 L) were made with from the barrier resin (copolyester-ether) and the base resin (polyester including oxidation additive) as described above. Each bottle was filled with 500 g water and capped securely. One at a time, each bottle was first dropped in an angle of 5° through a guide plate, then straight down from approx. 150 cm onto a steel plate. The guide plate ensured that the bottle reproducibly contacted the steel plate on their sidewall. Afterwards, the bottles were inspected for delamination and categorized as "delaminated bottle" if delamination was visually detected and categorized as "non-delaminated bottle" if no delamination was visually detected. Delamination was rated according to the total number of delaminated bottles.

In a third delamination test, twelve bottles (0.5 L) were made with from the barrier resin (copolyester-ether) and the base resin (polyester including the transition metal-based oxidation catalyst) as described above. Each bottle was filled with 500 g water and capped securely. One at a time, each bottle was first dropped in an angle of 5° through a guide plate, then straight down from approx. 150 cm onto a steel plate. The guide plate ensured that the bottle reproducibly contacted the steel plate on their sidewall. Afterwards, the bottles were inspected for their degree of delamination. The amount of delamination was calculated as followed:

$$\text{Amount of delamination} = \frac{\Sigma \text{ longest distance across the delamiated area}}{\Sigma \text{ delaminated bottles}}$$

Examples

First Aspect

Example A1. Synthesis of Copolyester-Ether (COPE E1)

Copolyester-ether was prepared using continuous polymerization process: A slurry of terephthalic (PTA) acid and glycol (EG) in a small molar excess of glycol (PTA/EG molar ratio <1:1.15) was continuously charged to the primary esterification reactor. The amount of slurry added to the primary esterification reactor was controlled by a flow measuring device. In the primary esterification reactor terephthalic acid and glycol reacted at 250-260° C. and 2-4 bar excess pressure under water elimination. The resulting low molecular weight esterification product was then transferred (via pump) to another reactor (secondary esterifier). A titanium catalyst (Sachtleben Hombifast HS06®, 12 ppm Ti based on the final polymer) and 20 weight-% of poly(tetramethylene oxide) glycol (Terathane® Polyetherglycol, having a number average molecular weight of 1400 g/mole, stabilized with 200 ppm Ethanox® 330) based on the final polymer weight were then added to the reaction mixture and the polycondensation, the elimination of glycol under reduced pressure, started at 250-260° C. The dwell time of the reaction mixture (pre-condensate) was again controlled by a flow measuring device. The pre-condensate was then discharged consecutively in two downstream reactors where the dwell time was controlled via the level of the reaction mixture in each reactor. In both reaction vessels glycol was distilled out of the reaction mixture under increased temperature and reduced pressure until the desired polymerization degree was achieved. The desired polymer melt flowed through the reactor discharge pump in a cooling bath with deionized water. After the polymer strand cooled, it was pelletized with Pell-tec pelletizer.

The intrinsic viscosity of the final copolyester-ether polymer compositions was 0.693 dl/g.

Example A2. Synthesis of the Base Polyester (BP1)

The base resin was prepared using continuous process: A slurry of terephthalic acid, isophthalic acid (3.05 wt.-% based on the final polymer) and glycol (PTA/EG molar ratio <1:1.08) was continuously charged to the primary esterification reactor. The amount of slurry added to the primary esterification reactor was controlled by a flow measuring device. In the primary esterification reactor terephthalic acid and glycol react at 250-260° C. and 2-4 bar excess pressure under water release. The resulting low molecular weight esterification product was then transferred (via pump) to another reactor (secondary esterifier). A titanium catalyst (Sachtleben Hombifast HS06®, 7 ppm Ti based on the final polymer) was then added to the reaction mixture and the polycondensation, the elimination of glycol under reduced pressure, started at 260-280° C. The dwell time of the reaction mixture (pre-condensate) is again controlled by a flow measuring device. The pre-condensate was then discharged consecutively in two downstream reactors whereas the dwell time was controlled via level of the reaction mixture in each reactor. In both reaction vessels further glycol was distilled out of the reaction mixture under increased temperature and reduced pressure until the desired polymerization degree is achieved. The oxidation catalyst (75 ppm Cobalt as Cobalt-stearate, CAS: 1002-88-6) was added late as a melt to the reaction mixture shortly before the polymer melt flowed through the reactor discharge pump in a cooling bath with deionized water. After the polymer strand cooled, it was pelletized with Pell-tec pelletizer.

The resulting polymer chips were crystallized for approx. 4 hours at 160° C., solid stated under vacuum at a temperature of 230° C. for approx. 7 hours to the desired intrinsic viscosity value (~IV-value: 0.860 dl/g) and then cooled to ambient temperature.

Example A3. Compounding of Copolyester-Ether (COPE E1) with Different Stabilizers The copolyester-ether COPE E1 described in Example A1 with an intrinsic viscosity of 0.693 dl/g was used for the compounding trials. Prior to the extrusion the COPE E1 was dried at 160° C. under vacuum for 5 hours to remove residual moisture. The COPE E1 was then mixed with different powdered additives via salt and pepper method and the resulting mixtures were subsequently extruded using an intermeshing, co-rotating, twin screw extruder manufactured by Leistritz AG. The process conditions used during the experiment are described below:

Extruder type: (Leistritz Micro 27 36 D), co-rotating, extruder screw diameter 27 mm, screw length to diameter ratio (L:D) ratio is 36:1

Operation conditions: T0 cooling water temperature/T1 210° C./T2 215° C./T3 210/T4-T5 240° C./T6-T8 210° C./T9 209° C.

No vacuum level in degassing area

Polymer flow rate 8 kg/h

Type of granules: cylindrical, length 3 mm and diameter 2 mm

The molten materials were extruded into a water bath and then pelletized. The intrinsic viscosity of the compounded material is about 0.668 dl/g. The kind and amount of the additives and the thermal decomposition products are summarized in the Tables A1 and A2 below. Table A1 shows the Hindered Amine Light Stabilizers (HALS) of the invention and Table A2 shows comparative stabilizers (UV-absorbers and thermo-oxidative stabilizers):

TABLE A1

| | Sample | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| HALS[1] | — | Uvinul ® 4050 | | | | | Uvinul ® 5050 | | | Uvinul ® 5062 | | | |
| Total amount [ppm] | — | 156 | 313 | 625 | 1250 | 2500 | 1513 | 3025 | 6050 | 781 | 1563 | 2500 | 3125 |
| Active N[2] [ppm] | — | 10 | 20 | 39 | 78 | 156 | 39 | 78 | 156 | 39 | 77 | 123 | 154 |
| Thermal $C_2$-$C_4$ decomposition products (ppm, detected in the resin) | | | | | | | | | | | | | |
| $C_2$-$C_4$ decomp. | 2436 | 1719 | 86 | 98 | 131 | 111 | 57 | 91 | 84 | 1918 | 579 | 1249 | 76 |

[1]Uvinul ® 4050 (N,N'-bisformyl-N,N'-bis-(2,2,6,6-tetramethyl-4-piperidinyl)-hexamethylendiamine), CAS: 124172-53-8 Uvinul ® 5050 (sterically hindered amine, oligomeric), CAS: 152261-33-1 Uvinul ® 5062 (sterically hindered amine, oligomeric), CAS: 65447-77-0
[2]Active N: Amount of nitrogen contained in functional groups which have the ability to generate a stable nitroxyl radical

TABLE A2

| | Sample | | | | | | | | |
|---|---|---|---|---|---|---|---|---|---|
| | 14 | 15 | 16 | 17 | 18 | 19 | 20 | 21 | 23 |
| Additive | UV-absorber[1] | | | | Thermo-oxidative stabilizer[2] | | | | |
| | Hostavin ® Aro8 | Tinuvin ® 234 | Tinuvin ® 1577 | Uvinul ® 3030 | Hostanox ® PEP-Q | | Ethanox ® 330 | | |
| [ppm] | 2500 | 2500 | 2500 | 2500 | 200 | 625 | 625 | 1250 | 2500 |
| Thermal decomposition products (ppm, detected in the resin) | | | | | | | | | |
| $C_2$-$C_4$ decomp. | 1971 | 1884 | 2314 | 2098 | 2288 | 1996 | 54 | 52 | 46 |

[1]Hostavin ® Aro8 (2-Hydroxy-4-n-octyloxybenzophenone), CAS: 1843-05-6 Tinuvin ® 234 (2-(2H-Benzotriazol-2-yl)-4,6-bis(1-methyl-1-phenylethyl)phenol, CAS: 70321-86-7 Tinuvin ® 1577 (2-(4,6-diphenyl-1,3,5-triazin-2-yl)-5-[(hexyl)oxy]-phenol, CAS: 147315-50-2 Uvinul ® 3030 (2-Propenoic acid, 2-cyano-3,3-diphenyl-,2,2-bis[[(2-cyano-1-oxo-3,3-diphenyl-2-propenyl)oxy] methyl]-1,3-propanediyl ester), CAS: 178671-58-4
[2]Hostanox ®PEP-Q (Diphosphonite antioxidant), CAS: 119345-01-6 Ethanox ® 330 (1,3,5-trimethyl-2,4,6-tris(3,5-di-t-butyl-4-hydroxybenzyl)benzene, CAS: 1709-70-2

As is evident from the above Table A1, the HALS compounds of the invention are substantially reducing the amount of $C_2$-$C_4$ decomposition products. Different HALS stabilizers of the invention are of similar potency with the exception of Uvinul® 5062 which is slightly less potent. Without being bound by theory, it may be speculated that this HALS stabilizer has first to be cleaved in-situ to yield a sterically hindered amine radical that is capable of scavenging radicals. Nevertheless, Uvinul® 5062 is more efficient in reducing $C_2$-$C_4$ decomposition products than other types of stabilizers such as Hostavin® Aro8, Tinuvin® 234, Tinuvin® 1577, Uvinul® 3030 and Hostanox® PEP-Q (Table 2).

Example A4. Influence of Different Stabilizers on Thermal Decomposition Products and Oxygen Barrier in Preforms and Bottles Unless otherwise stated, various modified barrier copolyester-ether of the present invention (see above Table A1 and A2) were dryed for about 24 hours at 110-120° C. under nitrogen atmosphere, blended with the dry base resin (BP1 from Example A2) which contains the transition metal catalyst, injection-molded into preforms and further stretch-blow molded into bottles (see below Table A3). The ratio of barrier resin to base resin was chosen as 5.0/95.0 (wt. by wt.). The preforms were stretch blow molded into 500 mL, 28 g bottles. The oxygen permeation, the color values as well as the haze of these bottles were measured. The bottles were then either cut and powdered (<0.1 mm) to determine the thermal by-product level or barrier measurement (as described in the Test Procedures). For reasons of better grindability, the thermal decomposition products were detected in the ground preforms and the barrier performance was measured in the bottles.

TABLE A3

| | Sample | | | | |
|---|---|---|---|---|---|
| | I | II | III | IV | V |
| Stabilizer | — | Uvinul ® 4050 | Hostavin ® Aro8 | Hostanox ® PEP-Q | Ethanox ® 330 |
| Amount stabilizer (added to the Copolyester-ester resin) [ppm] | — | 2500 | 2500 | 2500 | 625 |
| Thermal decomposition products (detected in the preforms) Total $C_2$-$C_4$ [ppm] | 461 | 234 | 416 | 387 | 432 |

TABLE A3-continued

|  | Sample | | | | |
|---|---|---|---|---|---|
|  | I | II | III | IV | V |
| Barrier performance after 56 days (measured in the bottles) [ppb] | 11 | 23 | 32 | 95 | 226 |

From the above Table A3, it is evident that HALS compounds of formula (I) are capable of substantially reducing the amount of $C_2$-$C_4$ decomposition products in final products such as preforms and bottles. At the same time, oxygen barrier properties of bottles are minimally affected. In comparison, other stabilizers do not provide the same performance: Hostavin® Aro8 does not yield a comparable reduction in degradation products and is also more negatively impacting barrier performance. Hostanox® PEP-Q is inferior in preventing degradation and provides substantially deteriorated barrier performance. Finally, Ethanox® 330 leads to poor oxygen barrier properties already at 625 ppm addition level. At the same concentration, Ethanox® 330 also provides poor protection against degradation.

Example A5. Influence of the Amount of HALS

In the next test series, the concentration of a HALS according to the invention was successively reduced. The following samples summarized in Table A4 were prepared as described in Example A4:

TABLE A4

|  | Sample | | | | |
|---|---|---|---|---|---|
|  | I | II | VI | VII | VIII |
| Stabilizer | — | Uvinul ® 4050 | | | |
| Amount stabilizer (added to the Copolyester-ester resin) [ppm] | — | 2500 | 1250 | 625 | 313 |
| Thermal decomposition products (detected in the preforms) Total $C_2$-$C_4$ [ppm] | 461 | 234 | 224 | 300 | 308 |
| Barrier performance after 56 days (measured in the bottles) [ppb] | 11 | 23 | 26 | 27 | 12 |

As is evident from the above Table A4, the HALS compounds of the invention retain their performance at very low concentrations.

Example A6. Terephthalic Acid (PTA)—Process for Preparing Further Copolyester-Ethers Terephthalic acid (PTA) and ethylene glycol (EG) in a small molar excess of glycol (PTA/EG molar ratio <1:1.15) were charged under nitrogen into a reactor equipped with a condenser, reflux column and stirrer. The materials were then stirred continuously, heated up to a temperature of 230° C. meanwhile undergo an esterification to form a low molecular weight esterification product under water release. Then, poly(tetramethylene oxide) glycol (Terathane® Polyetherglycol) of different molecular weights and different wt.-% ratios poly(tetramethylene oxide) glycol to PTA/EG), based on the final polymer, and Ethanox® 330 (CAS: 1709-70-2, 200 ppm, based on the weight of Terathane® Polyetherglycol) were then added together with a titanium catalyst (Sachtleben Hombifast HS06®, 25 ppm Ti, based on the polymer) to the reaction mixture. The mixture was transferred to an autoclave. In a time range of 30 minutes the pressure was reduced to <0.3 mm Hg while the temperature was ramped to 250° C. The reaction mixture was held at this temperature for approx. 130 min. Ten minutes before the product was extruded into chilled water the reactor was charged with nitrogen and different amounts of stabilizers were added in the reactor to the polymer melt. The mixture was stirred for additional 10 minutes. After the polymer strand cooled, it was pelletized with a Scheer-bay pelletizer.

The compositions of the prepared copolyester-ethers are listed in the below Tables A5 and A6.

TABLE A5

| Resin | Terathane ® (g/mol) | Terathane ® Polyetherglycol/ PTA-EG [wt. by wt.] | Stabilizer | Amount stabilizer (ppm) | Active $N_2$ [ppm] |
|---|---|---|---|---|---|
| 24 | 1400 | 35/65 | Uvinul ® 4050 | 375 | 47 |
| 25 | 1400 | 35/65 | Uvinul ® 4050 | 750 | 93 |
| 26 | 1400 | 35/65 | Uvinul ® 4050 | 15000 | 1866 |
| 27 | 1400 | 70/30 | Uvinul ® 4050 | 375 | 47 |
| 28 | 1400 | 70/30 | Uvinul ® 4050 | 750 | 93 |
| 29 | 1400 | 70/30 | Uvinul ® 4050 | 1500 | 187 |
| 30 | 1400 | 70/30 | Uvinul ® 4050 | 15000 | 1866 |
| 31 | 650 | 35/65 | Uvinul ® 4050 | 375 | 47 |
| 32 | 650 | 35/65 | Uvinul ® 4050 | 1500 | 187 |
| 33 | 2000 | 35/65 | Uvinul ® 4050 | 375 | 47 |
| 34 | 2000 | 35/65 | Uvinul ® 4050 | 1500 | 187 |

TABLE A6

| Resin | Terathane ® (g/mol) | Terathane ® Polyetherglycol/ PTA-EG [wt. by wt.] | Stabilizer | Amount stabilizer (ppm) | Active $N_2$ [ppm] |
|---|---|---|---|---|---|
| 35 | 1400 | 35/65 | Uvinul ® 5050 | 908 | 47 |
| 36 | 1400 | 35/65 | Uvinul ® 5050 | 3630 | 187 |
| 37 | 1400 | 35/65 | Tinuvin ® 622 | 469 | 23 |
| 38 | 1400 | 35/65 | Tinuvin ® 622 | 1875 | 92 |

Example A7. Preparation of Preforms and Bottles

The above barrier copolyester-ether of the present invention (see above Tables A5 and A6) were dried for about 24 hours at 110-120° C. under nitrogen atmosphere, blended with the dry base resin (either resin 2300K, available from INVISTA, or BP1, from Example A2) in the amounts indicated below and injection-molded into preforms which were further stretch-blow molded into 500 mL, 28 g bottles. The oxygen permeation of these bottles was measured. For reasons of better grindability, the thermal decomposition products were detected in the ground preforms.

Example A8. Variation Experiments

In a first series, preforms and bottles using Sb-based resin 2300 K, Terathane® 1400, a COPE-ratio of 35/65 (polyetherglycol/PTA-EG [wt. by wt.]) and the HALS Uvinol® 4050 were prepared:

TABLE A7

| Run | Stabilizer in COPE [ppm] | Weight Ratio PET/ COPE | Terathane in final composition [wt-%] | $C_2$-$C_4$ (preforms) [ppm] | Barrier performance [28 days, ppb] |
|---|---|---|---|---|---|
| 140557 | 1500 | 99.0/1.0 | 0.35 | 57 | 383 |
| 140173 | 750 | 97.5/2.5 | 0.875 | 383 | 156 |
| 140171 | 375 | 95.0/5.0 | 1.75 | 852 | 110 |

As is evident from the above Table A7, like in the Ti-based resins, the concentration of a HALS can be significantly reduced while still providing good protection against degradation. The barrier performance is still acceptable for an Sb-based resin system.

Next, preforms and bottles using Sb-based resin 2300 K, Terathane® 1400, a COPE-ratio of 35/65 (polyetherglycol/PTA-EG [wt. by wt.]) and the HALS Uvinol® 4050 were prepared. However, this time, the amount of Terathane in the final composition was substantially increased:

TABLE A8

| PTP | Stabilizer in COPE [ppm] | Weight Ratio PET/ COPE | Terathane in final composition [wt.-%] | $C_2$-$C_4$ (preforms) [ppm] | Barrier performance [28 days, ppb] |
|---|---|---|---|---|---|
| 140175 | 750 | 80.0/20.0 | 7 | 513 | 192 |
| 140178 | 15000 | 80.0/20.0 | 7 | 1039 | 426 |

As is evident from the above table, HALS also significantly reduced $C_2$-$C_4$ decomposition products at very high terathane concentrations of 7 wt.-% in the final blend. Since Terathane is the source of the $C_2$-$C_4$ decomposition products, the above results represent a very good performance for HALS. The barrier performance is still acceptable for an Sb-based resin system.

In another test series, it was investigated whether HALS is able to reduce decomposition products for other molecular weights than Terathane 1400. Preforms and bottles using Sb-based resin 2300 K, Terathane® 650, and 2000, a COPE-ratio of 35/65 (polyetherglycol/PTA-EG [wt. by wt.]) and the HALS Uvinol® 4050 were prepared:

TABLE A9

| PTP | Terathane | Stabilizer in COPE [ppm] | Weight Ratio PET/COPE | Terathane in final composition [wt.-%] | $C_2$-$C_4$ (preforms) [ppm] | Barrier performance [28 days, ppb] |
|---|---|---|---|---|---|---|
| 140525 | T2000 | 375 | 90.0/10.0 | 3.5 | 1169 | 123 |
| 140520 | T650 | 375 | 90.0/10.0 | 3.5 | 904 | 317 |

As is evident from the above table, HALS is equally able to reduce the $C_2$-$C_4$ decomposition products from polyethers of different weight. At a low molecular weight of 650 g/mol, the polyether is having diminished but still acceptable oxygen barrier properties. At a high molecular weight of 2000 g/mol, the polyether has still excellent oxygen barrier properties for an Sb-based system.

In the next test series, the ratio of polyester and polyether in the copolyester-ether was reversed. Preforms and bottles using Sb-based resin 2300 K, Terathane® 1400, a COPE-ratio of 70/30, instead of 35/65, (polyetherglycol/PTA-EG [wt. by wt.]) and the HALS Uvinol® 4050 were prepared:

TABLE A10

| PTP | Stabilizer in COPE [ppm] | Weight Ratio PET/ COPE | Terathane in final composition [wt.-%] | $C_2$-$C_4$ (preforms) [ppm] | Barrier performance [28 days, ppb] |
|---|---|---|---|---|---|
| 140317 | 15000 | 90.0/10.0 | 7 | 938 | 279 |
| 140316 | 1500 | 80.0/20.0 | 14 | 1315 | 370 |
| 140314 | 1500 | 99.0/1.0 | 0.7 | 280 | 104 |
| 140315 | 1500 | 95.0/5.0 | 3.5 | 951 | 104 |
| 140311 | 750 | 97.5/2.5 | 1.75 | 508 | 100 |
| 140312 | 750 | 90.0/10.0 | 7 | 1102 | 149 |
| 140310 | 375 | 95.0/5.0 | 3.5 | 880 | 91 |

As is evident from the above table, independently from the ratio of polyether to polyester in the copolyester-ether, HALS is capable of reducing $C_2$-$C_4$ decomposition products while maintaining good barrier properties. Even at extremely high loadings of 15,000 ppm, HALS is providing satisfactory barrier properties and low decomposition products (given the high concentration of polyether at 7 wt.-%). In addition, the above table shows that even at very high polyether concentrations of 14 wt.-%, HALS is providing good barrier properties and low decomposition products (given the high concentration of polyether at 14 wt.-%).

In another test trial, the structure of the HALS was varied. Preforms and bottles using Ti-based resin BP1, Terathane® 1400, a COPE-ratio of 35/65, (polyetherglycol/PTA-EG [wt. by wt.]) and the HALS Uvinol® 4050 and 5050 as well as Uvinul® 5062 were prepared:

TABLE A11

| PTP | HALS | Stabilizer in COPE [ppm] | Weight Ratio PET/COPE | Terathane in final composition [wt.-%] | C2-C4 (preforms) [ppm] | Barrier performance [28 days, ppb] |
|---|---|---|---|---|---|---|
| 140179 | U4050 | 375 | 95.0/5.0 | 1.75 | 857 | 21 |
| 140304 | U5050 | 908 | 95.0/5.0 | 1.75 | 729 | 24 |
| 140305 | U5050 | 3630 | 95.0/5.0 | 1.75 | 751 | 26 |
| 140306 | U5062 | 469 | 95.0/5.0 | 1.75 | 734 | 21 |
| 140307 | U5062 | 1875 | 95.0/5.0 | 1.75 | 642 | 22 |

As is evident from the above table, various HALS derivatives at various concentrations were equally able in providing excellent barrier properties and low decomposition products (given the high loading with polyether).

Second Aspect

Example B1. General Synthesis of the Base Polyesters

The base resins were either received from Invista Resin&Fibers GmbH or prepared using continuous process: A slurry of terephthalic acid (PTA), isophthalic acid (3.05 wt.-% based on the final polymer) and glycol in a small molar excess of glycol (EG) (PTA/EG molar ratio <1:1.08) were continuously charged to the primary esterification reactor. The amount of slurry added to the primary esterification reactor was controlled by a flow measuring device. In the primary esterification reactor, terephthalic acid and glycol react at 250-260° C. and 2-4 bar excess pressure under water release. The resulting low molecular weight esterification product was then transferred (via pump) to another reactor (secondary esterifier). A catalyst-glycol solution was then added to the reaction mixture and the polycondensation, the elimination of glycol under reduced pressure started at 260-280° C. The dwell time of the reaction mixture (pre-condensate) was again controlled by a flow measuring device. The pre-condensate was then discharged consecutively in two downstream reactors whereas the dwell time was controlled via level of the reaction mixture in each reactor. In both reaction vessels further glycol was distilled out of the reaction mixture under increased temperature and reduced pressure until the desired polymerization degree is achieved. Dependent on the desired base resins different concentration of the oxidation catalyst Co-Stearate (CAS: 1002-88-6) (see Table B1 below) were added late as a melt to the reaction mixture shortly before the polymer melt flowed through the reactor discharge pump in a cooling bath with deionized water. After the polymer strand cooled, it was pelletized with a Pell-tec pelletizer.

The resulting polymer chips were crystallized for approx. 4 hours at 160° C., solid stated under vacuum at a temperature of 230° C. for approx. 7 hours to the desired intrinsic viscosity value (~IV-value: 0.860 dl/g) and then cooled to ambient temperature.

An overview of the synthesized resin compositions as well as the intrinsic viscosities of the solid stated resins is set forth in Table B1.

TABLE B1

| Resin | Catalyst added [ppm] Ti[2] | Catalyst added [ppm] Sb[3] | Cobalt [ppm] | Intrinsic viscosity (IV, SSP) [dl/g] |
|---|---|---|---|---|
| Sb-BaseR1[1] | — | 250 | — | 0.81 |
| Sb-BaseR2 | — | 250 | 75 | 0.934 |
| Ti-BaseR1 | 7 | — | — | 0.86 |
| Ti-BaseR2 | | | 45 | 0.742 |
| Ti-BaseR3 | | | 75 | 0.797 |

[1]Commercial 1101 resin, received from Invista Resin&Fibers GmbH
[2]Sachtleben ® Hombifast HS06
[3]Sb$_2$O$_3$ Example B2. Synthesis of Copolyester-Ether—COPE (CP) Barrier Resins (BarrierR1-4)

Copolyester-ether was prepared using continuous polymerization process: A slurry of terephthalic acid and glycol in a small molar excess of glycol (PTA/EG molar ratio <1:1.15) were continuously charged to the primary esterification reactor. The amount of slurry added to the primary esterification reactor was controlled by a flow measuring device. In the primary esterification reactor, terephthalic acid and glycol reacted at 250-260° C. and 2-4 bar excess pressure under water elimination. The resulting low molecular weight esterification product was then transferred (via pump) to another reactor (secondary esterifier). A titanium catalyst (Sachtleben Hombifast HS06®, 12 ppm Ti based on the final polymer) and different amounts of poly(tetramethylene oxide) glycol (Terathane® Polyetherglycol, having a number average molecular weight of 1400 g/mole, stabilized with 200 ppm Ethanox® 330, CAS: 1709-70-2) based on the final polymer weight were then added to the reaction mixture. The amounts of Terathane® Polyetherglycol added are indicated in Table B2 below. The polycondensation, the elimination of glycol under reduced pressure started at 250-260° C. The dwell time of the reaction mixture (pre-condensate) was again controlled by a flow measuring device. The pre-condensate was then discharged consecutively in two downstream reactors where the dwell time was controlled via the level of the reaction mixture in each reactor. In both reaction vessels glycol was distilled out of the reaction mixture under increased temperature and reduced pressure until the desired polymerization degree was achieved. The desired polymer melt flowed through the reactor discharge pump into a cooling bath filled with deionized water. After the polymer strand cooled, it was pelletized with a Pell-tec pelletizer.

The compositions of the final copolyester-ethers as well as intrinsic viscosities of the resins are shown in Table B2 below.

TABLE B2

| Sample | Terathane ® Polyetherglycol/PTA-EG[1] [wt. by wt.] | Intrinsic viscosity (IV) [dl/g] |
|---|---|---|
| BarrierR1 | 10/90 | 0.739 |
| BarrierR2 | 20/80 | 0.657 |
| BarrierR3 | 25/75 | 0.701 |
| BarrierR4 | 30/70 | 0.718 |

[1]PTA/EG molar ratio <1:1.15

Example B3. Synthesis of Stabilized Copolyester-Ether—COPE Barrier Resin (BarrierR5)

Synthesis of the Terathane® Polyetherglycol ($M_N$—1400 g/mol)/PTA-EG copolymer with a certain additive package via late addition: Terephthalic acid, ethylene glycol (molar ratio PTA/EG molar ratio <1:1.15), 43 wt.-% of poly(tetramethylene oxide) glycol (Terathane® Polyetherglycol, having a number average molecular weight of 1400 g/mole, stabilized with 200 ppm Ethanox® 330) based on the final polymer weight and a catalyst solution (Sachtleben® Hombifast HS06, 17 ppm Titan based on the final polymer) were polymerized under continuous polymerization process conditions as described above (see Example B2). 2500 ppm N,N'-bisformyl-N,N'-bis-(2,2,6,6-tetramethyl-4-piperidinyl)-hexa-methylenediamine (Uvinul®4050, CAS: 124172-53-8), 2500 ppm 2-Hydroxy-4-n-octyloxybenzophenone (Hostavin® Aro8, CAS: 1843-05-6) and 200 ppm Tetrakis (2,4-di-tert-butylphenyl)-1,1-biphenyl-4,4'-diylbisphosphonite (Hostanox® PEP-Q, CAS: 38613-77-3) were added late as a melt to the reaction mixture shortly before the polymer melt flowed through the reactor discharge pump in a cooling bath with deionized water. After the polymer strand cooled, it was pelletized with a Pell-tec pelletizer. The intrinsic viscosity of the final stabilized copolyester-ether barrier resin R5 was 0.855 dl/g.

Example B4. Preform and Bottle Properties

Oxygen Barrier Properties of Barrier Resin and Base Resins Excluding an Oxidation Catalyst In the following example, the oxygen barrier properties of base resins prepared by using titanium-based and antimony-based polycondensation catalysts were verified for comparative purposes.

Base resins without an oxidation catalyst as indicated in the Table B1 were blended with the commercial Oxyclear® 3500 barrier resin, received from Invista Resins&Fibers GmbH, and injection molded into preforms. The preforms were stretch blow molded into 500 mL, 28 g bottles. The oxygen permeation was measured. The compositions of the bottles as well as average oxygen ingress over 56 days are depicted in Table B3.

TABLE B3

| Sample | Ratio Barrier resin/Base resin [wt.-%] | Barrier resin composition | Base Resin composition | Oxygen ingress (ppb, 56 days) |
|---|---|---|---|---|
| 1 | 2.0/98.0 | commercial Oxyclear ® 3500 barrier resin | Ti-BaseR1 | 742 |
| 2 |  |  | Sb-BaseR1 | 818 |

As is evident from the above Table B3, the base resins containing the antimony-based polycondensation catalyst exhibit no noticeable active oxygen scavenging activity (818 ppb after 56 days). The titanium-based polycondensation catalyst also provides very poor to negligible oxygen barrier properties (742 ppb after 56 days).

Oxygen Barrier Properties of Barrier Resins and Base Resins Including an Oxidation Catalyst Different dried and solid stated base resins as indicated in the Table B1 were blended with the stabilized barrier resin R5 (see Example B3), described above, and injection molded into preforms. The preforms were stretch blow molded into 500 mL, 28 g bottles. The oxygen permeation was measured. The compositions of the bottles as well as average oxygen ingress over 56 days are depicted in Table B4.

TABLE B4

| | | Barrier Resin composition | | | | |
|---|---|---|---|---|---|---|
| Run | Ratio Barrier resin/Base resin [wt.-%] | Name | Terathane ® Polyetherglycol/ PTA-EG [wt. by wt.] | Base Resin Name (amount Co in resin) | Oxygen ingress (ppb, 56 days) | Wt.-% Ratio transition metal:Ti |
| 3 | 2.3/97.7 | BarrierR5 | 43/57 | Sb-BaseR2 (75 ppm Co) | 310 | 192:1 |
| 4 | | | | Ti-BaseR3 (75 ppm Co) | 51 | 10:1 |
| 5 | 2.0/98 | Oxyclear ® 3500 barrier resin | 50/50 | Sb-BaseR2 (75 ppm Co) | 141 | 1101:1 |
| 6 | | | | Ti-BaseR3 (75 ppm Co) | 32 | 10:1 |

As is evident from the above Table B4, the use of a titanium compound in combination with a transition metal based oxidation catalyst substantially reduces the oxygen ingress in the bottle (51 and 32 ppb after 56 days, respectively). In addition, the oxygen barrier is substantially improved in comparison to the antimony-based resins (51 vs. 310 ppb and 32 vs. 141 ppb, respectively). The improvement is substantially higher than would be expected in light of the very poor to negligible oxygen barrier properties provided by the titanium polycondensation catalyst on its own (see above Oxygen barrier properties of barrier resin and base resins excluding an oxidation catalyst).

Oxygen Barrier Properties of Barrier Resins Differing in their Compositions

Ti-BaseR3 as indicated in the Table B1 was blended with different barrier resins as indicated in Table B2 and injection molded into preforms. The preforms were stretch blow molded into 500 mL, 28 g bottles, and the oxygen permeation was measured. The compositions of the bottles as well as average oxygen ingress over 56 days are depicted in Table B5.

TABLE B5

| | Barrier Resin composition | | | | | |
|---|---|---|---|---|---|---|
| | Barrier resin/ | | Terathane ® Polyetherglycol/ | Base Resin composition | Oxygen ingress | Wt.-% Ratio |
| Run | Base resin [wt.-%] | Name | PTA-EG [wt. by wt.] | Name | Co [ppm] | (ppb, 56 days) | transition metal:Ti |
| 7 | 10.0/90.0 | BarrierR1 | 10-90 | Ti-BaseR3 | 75 | 21 | 10:1 |
| 8 | 5.0/95.0 | BarrierR2 | 20-80 | | | 23 | 10:1 |
| 9 | 4.0/96.0 | BarrierR3 | 25-75 | | | 30 | 10:1 |
| 10 | 3.3/96.7 | BarrierR4 | 30-70 | | | 41 | 11:1 |

As is evident from the above Table B5, the variation of the Terathane® Polyetherglycol/PTA-EG ratio further improves the oxygen barrier properties in the presence of a titanium compound. There is a trend that changing the Terathane® Polyetherglycol/PTA-EG ratio from e.g. 50:50 to 10:90 improves oxygen barrier.

Oxygen Barrier Properties of Barrier Resin and Base Resins Including an Oxidation Catalyst that Differ in its Concentration Different dried and solid stated base resins as indicated in the Table B1 were blended with the barrier resin BarrierR5 (see Example B3) and injection molded into preforms. The preforms were stretch blow molded into 500 mL, 28 g bottles. The oxygen permeation was measured. The compositions of the bottles as well as average oxygen ingress over 56 days are depicted in Table B6.

TABLE B6

| | Barrier Resin composition | | | | | |
|---|---|---|---|---|---|---|
| | Barrier resin/ | | Terathane ® Polyetherglycol/ | Base Resin composition | Oxygen ingress | Wt.-% Ratio |
| Run | Base resin [wt.-%] | Name | PTA-EG [wt. by wt.] | Name | Co [ppm] | (ppb, 56 days) | transition metal:Ti |
| 11 | 2.3/97.7 | BarrierR5 | 43/57 | Ti-BaseR2 | 45 | 39 | 4:1 |
| 4 | | | | Ti-BaseR3 | 75 | 51 | 6:1 |

As is evident from the above Table B6, the presence of a titanium compound in the bottle resin composition allows reducing the amount of cobalt oxidation catalyst required for obtaining satisfying oxygen barrier properties.

Third Aspect

Example C1. Synthesis of the Base Polyester

The base resins were either received from Invista Resin&Fibers GmbH or prepared using continuous process: A slurry of terephthalic acid (PTA), isophthalic acid (3.05 wt.-% based on the final polymer) and glycol (EG) in a small molar excess of glycol (PTA/EG molar ratio <1:1.08) were continuously charged to the primary esterification reactor. The amount of slurry added to the primary esterification reactor was controlled by a flow measuring device. In the primary esterification reactor, terephthalic acid and glycol react at 250-260° C. and 2-4 bar excess pressure under water release. The resulting low molecular weight esterification product was then transferred (via pump) to another reactor (secondary esterifier). A catalyst-glycol solution was then added to the reaction mixture and the polycondensation, the elimination of glycol under reduced pressure started at 260-280° C. The dwell time of the reaction mixture (pre-condensate) was again controlled by a flow measuring device. The pre-condensate was then discharged consecutively in two downstream reactors whereas the dwell time was controlled via level of the reaction mixture in each reactor. In both reaction vessels further glycol was distilled out of the reaction mixture under increased temperature and reduced pressure until the desired polymerization degree is achieved. The oxidation catalyst (75 ppm cobalt as Cobalt-stearate, CAS: 1002-88-6) was added late as a melt to the reaction mixture shortly before the polymer melt flowed through the reactor discharge pump in a cooling bath with deionized water. After the polymer strand cooled, it was pelletized with a Pell-tec pelletizer.

The resulting polymer chips were crystallized for approx. 4 hours at 160° C., solid stated under vacuum at a temperature of 230° C. for approx. 7 hours to the desired intrinsic viscosity value (~IV-value: 0.860 dl/g) and then cooled to ambient temperature.

An overview of the synthesized resin compositions as well as the intrinsic viscosities of the solid stated resins is set forth in Table C1.

TABLE C1

| Resin | Catalyst added [ppm] | | Cobalt [ppm] | Intrinsic viscosity (IV, SSP) [dl/g] |
|---|---|---|---|---|
| | $Ti^2$ | $Sb^3$ | | |
| Sb-BaseR1[1] | — | 250 | 75 | 0.86 |
| Sb-BaseR2 | — | 250 | 75 | 0.934 |
| Ti-BaseR1 | 7 | — | 75 | 0.797 |

[1]2300K resin, received from Invista Resin&Fibers GmbH
[2]Sachtleben ® Hombifast HS06
[3]$Sb_2O_3$ Example C2. General Synthesis of the Barrier Resins Copolyester-ether was prepared using continuous polymerization process: A slurry of terephthalic acid and glycol in a small molar excess of glycol (PTA/EG molar ratio <1:1.15) were continuously charged to the primary esterification reactor. The amount of slurry added to the primary esterification reactor was controlled by a flow measuring device. In the primary esterification reactor, terephthalic acid and glycol reacted at 250-260° C. and 2-4 bar excess pressure under water elimination. The resulting low molecular weight esterification product was then transferred (via pump) to another reactor (secondary esterifier). A titanium catalyst (Sachtleben Hombifast HS06®, 12 ppm Ti based on the final polymer) and different amounts of poly(tetramethylene oxide) glycol (Terathane® Polyetherglycol, having a number average molecular weight of 1400 g/mole, stabilized with 200 ppm Ethanox® 330, CAS: 1709-70-2) based on the final polymer weight were then added to the reaction mixture. The amounts of Terathane® Polyetherglycol added are indicated in below Table C2. The polycondensation, the elimination of glycol under reduced pressure started at 250-260° C. The dwell time of the reaction mixture (pre-condensate) was again controlled by a flow measuring device. The pre-condensate was then discharged consecutively in two downstream reactors where the dwell time was controlled via the level of the reaction mixture in each reactor. In both reaction vessels glycol was distilled out of the reaction mixture under increased temperature and reduced pressure until the desired polymerization degree was achieved. The desired polymer melt flowed through the reactor discharge pump into a cooling bath filled with deionized water. After the polymer strand cooled, it was pelletized with a Pell-tec pelletizer.

The compositions of the final copolyester-ethers as well as the intrinsic viscosities of the resins are shown in Table C2 below.

TABLE C2

| Sample | Terathane ® Polyetherglycol/PTA-EG[1] [wt. by wt.] | Intrinsic viscosity (IV) [dl/g] |
|---|---|---|
| BarrierR1 | 10/90 | 0.739 |
| BarrierR2 | 20/80 | 0.657 |
| BarrierR3 | 30/70 | 0.718 |

[1]PTA/EG molar ratio <1:1.15

Example C3. Preform and Bottle Properties

Ti-BaseR3 as indicated in the Table C1 was blended with different barrier resins as indicated in Table C2 and injection molded into preforms. The preforms were stretch blow molded into 500 mL, 28 g bottles, and the oxygen permeation was measured. The compositions of the bottles as well as average oxygen ingress over 56 days are depicted in Table C3.

TABLE C3

| | | Barrier Resin composition | | | | |
|---|---|---|---|---|---|---|
| Run | Barrier resin/ Base resin [wt.-%] | Name | Ratio Terathane ® Polyetherglycol/ PTA-EG [wt. by wt.] | Base Resin composition | | Oxygen ingress (ppb, 56 days) | Wt.-% Ratio transition metal:Ti |
| | | | | Name | Co [ppm] | | |
| 5 | 10.0/90.0 | BarrierR1 | 10-90 | Ti-BaseR1 | 75 | 21 | 10:1 |
| 6 | 5.0/95.0 | BarrierR2 | 20-80 | | | 23 | 10:1 |
| 7 | 3.3/96.7 | BarrierR3 | 30-70 | | | 41 | 10:1 |

As is evident from the above Table C3 and also FIG. 1, the variation of Terathane® Polyetherglycol/PTA-EG ratio from 30/70 to 10/90 reduces the spike in oxygen ingress seen in the first days after compounding in a linear fashion in the tested titanium-containing blends.

Fourth Aspect

Synthesis of Copolyester-Ethers, Batch Process

Examples D1 and D2 illustrate batch processes for the preparation of copolyester-ethers. The proportions of the various components used in this example can be varied as required, as understood by the person skilled in the art.

Example D1. Terephthalic Acid (PTA)—Process (Samples 1-6)

Terephthalic acid (PTA) and ethylene glycol (EG) in a small molar excess of glycol (PTA/EG molar ratio <1:1.15)

were charged under nitrogen into a reactor equipped with a condenser, reflux column and stirrer. The materials were then stirred continuously, heated up to a temperature of 230° C. meanwhile undergo an esterification to form a low molecular weight esterification product under water release. Then, poly(tetramethylene oxide) glycol (Terathane® Polyetherglycol) of different molecular weights as indicated in the below Table D1, in an equivalent amount to 50 wt.-% of the final polymer, and Ethanox® 330 (CAS: 1709-70-2, 200 ppm based on the weight of Terathane® Polyetherglycol,) were then added together with a titanium catalyst (Sachtleben Hombifast HS06®, 20 ppm Ti based on the polymer) to the reaction mixture. The mixture was transferred to an autoclave. In a time range of 30 minutes the pressure was reduced to <0.3 mm Hg while the temperature was ramped to 250° C. The reaction mixture was held at this temperature for approx. 130 min, then the reactor was pressurized slightly with nitrogen, and the product was extruded into chilled water. After the polymer strand cooled, it was pelletized with a Scheer-bay pelletizer.

The compositions of the final copolyester-ethers as well as the thermal behavior are shown in Table D1 below.

TABLE D1

| | Sample | | | | | |
|---|---|---|---|---|---|---|
| | 1 | 2 | 3 | 4 | 5 | 6 |
| Terathane ® Polyetherglycol [g/mol] | 250 | 650 | 1000 | 1400 | 2000 | 2900 |
| $T_m$ [° C.] | — | 176 | 205 | 224 | 244 | 246 |

Example D2. Dimethyl Terephthalate (DMT)—Process (Samples 7-12)

Dimethyl terephthalate, a molar excess of ethylene glycol (1:2.1 mole) and zinc acetate (50 ppm Zn) as the ester interchange catalyst were charged under nitrogen into a reactor equipped with a condenser, reflux column and stirrer. The materials were stirred continuously during the transesterification and were heated to a temperature of 160-230° C. under atmospheric pressure until the ester interchange reaction was complete, as evidenced by the amount of methanol removed. Triethyl phosphonoacetate (33 ppm P, CAS: 867-13-0), poly(tetramethylene oxide) glycol (Terathane® Polyetherglycol) of different molecular weights as indicated in below Table D2, in an equivalent amount to 50 weight % of the final polymer and Ethanox® 330 (CAS: 1709-70-2, 200 ppm based on the wt.-% Terathane® Polyetherglycol) were then added together with tetrabutyl titanate (20 ppm Ti, Tyzor®, DuPont, USA) as a polycondensation catalyst. The mixture was transferred to an autoclave. Over a time period of 90 minutes the pressure was reduced to <0.3 mm Hg while the temperature was ramped to 250° C. The reaction mixture was held at this temperature until the required melt viscosity, as measured by the stirrer amperage, was met. The reactor was pressurized slightly with nitrogen and the product extruded into chilled water. After the polymer strand cooled, it was pelletized with a Scheer-bay pelletizer.

The compositions of the final copolyester-ethers as well as the thermal behavior are shown in Table D2 below.

TABLE D2

| | Sample | | | | | |
|---|---|---|---|---|---|---|
| | 7 | 8 | 9 | 10 | 11 | 12 |
| Terathane ® Polyetherglycol [g/mol] | 250 | 650 | 1000 | 1400 | 2000 | 2900 |
| Tm [° C.] | — | 181 | 206 | 224 | 241 | 245 |

As is evident from the above Tables D1 and D2, the melting point ($T_m$) of the copolyester-ether depends in linear fashion on the molecular weight of the employed polyether.

Example D3. Synthesis of Starting Materials, Continuous Polymerization Process

Copolyester-ether was prepared using continuous polymerization process: A slurry of terephthalic acid and glycol in a small molar excess of glycol (PTA/EG molar ratio <1:1.15) was continuously charged to the primary esterification reactor. The amount of slurry added to the primary esterification reactor was controlled by a flow measuring device. In the primary esterification reactor, terephthalic acid and glycol reacted at 250-260° C. and 2-4 bar excess pressure under water elimination. The resulting low molecular weight esterification product was then transferred (via pump) to another reactor (secondary esterifier). A titanium catalyst and different amounts of poly(tetramethylene oxide) glycol (Terathane® Polyetherglycol, having a number average molecular weight of 1400 g/mole, stabilized with 200 ppm Ethanox® 330) based on the final polymer weight were then added to the reaction mixture. The amounts of Terathane® Polyetherglycol added and the type of titanium catalyst used are indicated in below Table D3. The polycondensation, the elimination of glycol under reduced pressure started at 250-260° C. The dwell time of the reaction mixture (pre-condensate) was again controlled by a flow measuring device. The pre-condensate was then discharged consecutively in two downstream reactors where the dwell time was controlled via the level of the reaction mixture in each reactor. In both reaction vessels glycol was distilled out of the reaction mixture under increased temperature and reduced pressure until the desired polymerization degree was achieved. The desired polymer melt flowed through the reactor discharge pump into a cooling bath filled with deionized water. After the polymer strand cooled, it was pelletized with a Pell-tec pelletizer.

The compositions of the final copolyester-ethers as well as the thermal behavior are shown in Table D3 below

TABLE D3

| | Sample | | | | | | | | | | |
|---|---|---|---|---|---|---|---|---|---|---|---|
| | 13 | 14 | 15 | 16 | 17 | 19 | 20 | 21 | 22 | 23 | 18 |
| Catalyst | HS06[2] | HS06 | HS06 | HS06 | HS06 | TBT[3] | TBT | TBT | TBT | TBT | TBT |
| Catalyst [ppm Ti] | 14 | 13 | 13 | 13 | 17 | 32 | 30 | 28 | 29 | 15 | 22 |

TABLE D3-continued

| | Sample | | | | | | | | | | |
|---|---|---|---|---|---|---|---|---|---|---|---|
| | 13 | 14 | 15 | 16 | 17 | 19 | 20 | 21 | 22 | 23 | 18 |
| Terathane ® Polyetherglycol/PTA-EG[1] [wt. by wt.] | 10/90 | 20/80 | 25/75 | 30/70 | 43/57 | 20/80 | 27/73 | 43/57 | 50/50 | 50/50 | 0/100 |
| $T_m$ [° C.] | 248 | 246 | 245 | 242 | 237 | 250 | 243 | 237 | 228 | 229 | 253 |

[1]PTA/EG ratio: <1:1.15
[2]Sacthleben ® Hombifast HS06 - Ti-based catalyst
[3]TBT—Tetrabutyltitanat Tyzor ®, DuPont, USA As is demonstrated in the above Table D3, the melting point ($T_m$) in both types of polyester-ether copolymers (Samples 13-17 and 19-22) depends on the weight ratio of the polyether segment to the polyester segment in linear fashion.

Example D4. Additional Copolyester-Esters

Further samples 24-34 were prepared following the process described above in Example D1 except that 25 ppm Ti (Sachtleben Hombifast HS06®) were used. The compositions of the final copolyester-ethers as well as the thermal behavior are shown in Table D4 below.

TABLE D4

| Sample | Mw Terathane ® Polyetherglycol [g/mol] | wt.-%-ratio Terathane ® Polyetherglycol/PTA-EG | $T_m$ [° C.] |
|---|---|---|---|
| 24 | 650 | 15/85 | 244 |
| 25 | 1400 | 5/95 | 254 |
| 26 | | 15/85 | 251 |
| 27 | | 25/75 | 248 |
| 28 | | 35/65 | 241 |
| 29 | | 45/55 | 234 |
| 30 | 2000 | 15/85 | 253 |
| 31 | | 35/65 | 248 |
| 32 | 2900 | 15/85 | 253 |
| 33 | | 35/65 | 250 |

It is evident from samples 24-33, in particular from samples 25-29, that the melting point ($T_m$) of the copolyester-ether depends in linear fashion on the amount of the employed polyether in the copolyester-ether.

Example D5. Preparation of Preforms/Bottles from Barrier/Base Resin Blend: Physical Properties and Delamination as Well as Barrier Behavior Synthesis of the Base Polyester (BP1)

The base resin was prepared using continuous process: A slurry of terephthalic acid, isophthalic acid (3.05 wt.-% based on the final polymer) and glycol in a small molar excess of glycol (PTA/EG molar ratio <1:1.08) was continuously charged to the primary esterification reactor. The amount of slurry added to the primary esterification reactor was controlled by a flow measuring device. In the primary esterification reactor, terephthalic acid and glycol react at 250-260° C. and 2-4 bar excess pressure under water release. The resulting low molecular weight esterification product was then transferred (via pump) to another reactor (secondary esterifier). A titanium catalyst (Sachtleben HombifastHS06, 7 ppm Ti based on the final polymer) was then added to the reaction mixture and the polycondensation, the elimination of glycol under reduced pressure started at 260-280° C. The dwell time of the reaction mixture (pre-condensate) was again controlled by a flow measuring device. The pre-condensate was then discharged consecutively in two downstream reactors whereas the dwell time was controlled via level of the reaction mixture in each reactor. In both reaction vessels further glycol was distilled out of the reaction mixture under increased temperature and reduced pressure until the desired polymerization degree is achieved. The oxidation catalyst (75 ppm cobalt as Cobalt-stearate, CAS: 1002-88-6) was added late as a melt to the reaction mixture shortly before the polymer melt flowed through the reactor discharge pump in a cooling bath with deionized water. After the polymer strand cooled, it was pelletized with a Pell-tec pelletizer.

The resulting polymer chips were crystallized for approx. 4 hours at 160° C., solid stated under vacuum at a temperature of 230° C. for approx. 7 hours to the desired intrinsic viscosity value (~IV-value: 0.860 dl/g) and then cooled to ambient temperature.

Preforms/Bottles

Barrier resins as indicated in the below Table D5 were dried and blended in varying amounts (from 2 to 10 wt.-%) with the dried base polyester resin (BP1), and injection molded into preforms. The preforms were stretch blow molded into 500 mL, 28 g bottles. The oxygen permeation, the color values as well as the haze of these bottles were measured.

The compositions of the preforms and bottles as well as physical properties are depicted in Table D5. Table D5 further shows the obtainable delamination behavior.

TABLE D5

| | | | Bottle/Preform no. | | | |
|---|---|---|---|---|---|---|
| | | | I | II | III | IV[3] |
| Preform/Bottle composition | Barrier resin | sample | 13 | 14 | 16 | 24 |
| | | Terathane ® Polyetherglycol/PTA-EG[1] [wt. by wt.] | 10/90 | 20/80 | 30/70 | 50/50 |
| | | [wt.-%] | 10 | 5 | 3.3 | 2 |
| | Base resin (BP1) | [wt.-%] | 90.0 | 95.0 | 96.7 | 98.0 |

TABLE D5-continued

|  |  |  | Bottle/Preform no. | | | |
|---|---|---|---|---|---|---|
|  |  |  | I | II | III | IV[3] |
| Bottles | Bottle properties | IV (dl/g) | 0.824 | 0.819 | 0.808 | 0.829 |
|  |  | L | 89 | 88.7 | 88.5 | 87.3 |
|  |  | a* | 0.02 | 0.04 | −0.02 | 0.19 |
|  |  | b* | 3.12 | 3.6 | 4.42 | 5.26 |
|  |  | Haze [%] | 2.4 | 2.1 | 2.1 | 3 |
| Delamination test (bottles) | (Delamination Tendency[2]) |  | +++ | ++ | + | 0 |
| Barrier performance after 28 days | [ppb] |  | 22 | 24 | 43 | 44 |

[1]PTA/EG ratio <1:1.15
[2]first delamination test, +++: excellent, no delamination detected ++: very good, almost no delamination detected; +: good: some delamination detected in some bottles 0: poor, delamination detected in most bottles
[3]commercial resin Oxyclear ® 3500 barrier resin Those bottles falling within the scope of the present invention (bottle/preforms I, II, and III obtained from samples 13, 14 and 16) are substantially superior in their delamination behavior to comparable samples outside of the scope (sample IV obtained from sample 24). The bottles falling within the scope of the present invention have excellent barrier properties.

Example D6. Preparation of Preforms/Bottles from Barrier/Base Resin Blends: Delamination Properties The samples 24-33 prepared in Example D4 were dried and blended in varying amounts with the dried base polyester resin (resin 2300K, obtainable from INVISTA, m.p. 244.5° C.) to obtain a final polyether concentration of 1 or 7 wt.-%, and injection molded into preforms. The preforms were stretch blow molded into 500 mL, 28 g bottles, according to the previously described procedure. The bottle compositions are indicated in the below Table D6:

TABLE D6

| | COPE | | |
|---|---|---|---|
| Sample | Terathane ® Polyetherglycol [g/mol] | wt.-%-ratio Terathane ® Polyetherglycol/PTA-EG | Polyether in bottle (wt.-%) |
| 34 | 1400 | 5/95 | 1 |
| 35 | 1400 | 15/85 | 1 |
| 36 | 1400 | 25/75 | 1 |
| 37 | 1400 | 35/65 | 1 |
| 38 | 1400 | 45/55 | 1 |
| 39 | 1400 | 35/65 | 7 |
| 10 | 250 | 35/65 | 1 |
| 41 | 650 | 15/85 | 1 |
| 42 | 2000 | 15/85 | 1 |
| 43 | 2000 | 35/65 | 1 |
| 44 | 2900 | 15/85 | 1 |
| 45 | 2900 | 35/65 | 1 |

The bottles prepared from samples 34 to 45 were tested for delamination according to the second delamination test. All bottles showed improved delamination (i.e. lower total numbers of delaminated bottles) than bottles prepared from comparative reference sample 23.

Example D7. Preparation of Preforms/Bottles from Barrier/Base Resin Blends: Delamination Properties Samples of copolyester-ethers prepared in Example D4 were dried and blended in varying amounts with the dried base polyester resin (resin 2300K, obtainable from INVISTA, m.p. 244.5° C.) to obtain a final polyether concentration of 1 wt.-%, and injection molded into preforms. The preforms were stretch blow molded into 500 mL, 28 g bottles, according to the previously described procedure. The bottle compositions are indicated in the below Table D7. The prepared bottles were tested for delamination according to the third delamination test.

TABLE D7

| | Copolyester-ether (COPE) | | ΔT | |
|---|---|---|---|---|
| Sample | Terathane ® Polyetherglycol [g/mol] | wt.-%-ratio Terathane ® Polyetherglycol/PTA-EG | (m.p. base resin − m.p. COPE) (° C.) | Amount of delamination (cm) |
| 46 | 1400 | 15/85 | 6.5 | 0.75 |
| 47 | 1400 | 45/55 | 10.5 | 2.54 |
| 48 | 2900 | 15/85 | 8.5 | 1.37 |
| 49 | 2900 | 35/65 | 5.5 | 0.9 |

The above table demonstrates that bottles prepared according to the invention show a low amount of delamination. In addition, delamination decreased in the above examples with decreasing temperature difference between the melting points of the base resin and the copolyester-ether.

Example D8. Preparation of Preforms/Bottles from Barrier/Base Resin Blends: Delamination Properties In order to compare the influence of the base resin on delamination performance, the following base resins compositions were prepared which, like resin 2300K base resin, comprise 83 ppm cobalt as oxidation catalyst.

TABLE D8

| Polyester | Catalyst | Co [ppm] | $T_m$ of base resin (° C.) |
|---|---|---|---|
| 7090 | Ti | 83 | 225° C. |
| T94N | Sb | 83 | 240.9° C. |
| 1101 | Sb | 83 | 245.7° C. |
| BRC | Ti | 83 | 242° C. |
| 2300K | Sb | 83 | 244.5° C. |

Resins 7090, T94N and 1101 are commercially available from INVISTA. Resin BRC was prepared as follows in Example D9-D10.

Example D9. Synthesis of the Base Polyester (BRC)

The base resin BRC was prepared using continuous process: A slurry of terephthalic acid, isophthalic acid (3.05 wt.-% based on the final polymer) and glycol in a small molar excess of glycol (PTA/EG molar ratio <1:1.08) was continuously charged to the primary esterification reactor. The amount of slurry added to the primary esterification reactor was controlled by a flow measuring device. In the primary esterification reactor terephthalic acid and glycol react at 250-260° C. and 2-4 bar excess pressure under water release. The resulting low molecular weight esterification product was then transferred (via pump) to another reactor (secondary esterifier). A titanium catalyst (Sachtleben Hombifast HS06®, 7 ppm Ti based on the final polymer) was then added to the reaction mixture and the polycondensation, the elimination of glycol under reduced pressure, started at 260-280° C. The dwell time of the reaction mixture (pre-condensate) is again controlled by a flow measuring device. The pre-condensate was then discharged consecutively in two downstream reactors whereas the dwell time was controlled via level of the reaction mixture in each reactor. In both reaction vessels further glycol was distilled out of the reaction mixture under increased temperature and reduced pressure until the desired polymerization degree is achieved. The polymer melt flowed through the reactor discharge pump in a cooling bath with deionized water. After the polymer strand cooled, it was pelletized with Pell-tec pelletizer.

The resulting polymer chips were crystallized for approx. 4 hours at 160° C., solid stated under vacuum at a temperature of 230° C. for approx. 7 hours to the desired intrinsic viscosity value (~IV-value: 0.860 dl/g) and then cooled to ambient temperature.

Example D10. Compounding of Base Resins with the Catalyst

The different Base Resins described above (except 2300K) were used for compounding. Prior to the extrusion the Base Resins were dried at 160° C. under vacuum for 5 hours to remove residual moisture. The Base Resins were then added to an intermeshing, co-rotating, twin screw extruder manufactured by Leistritz AG. The oxidation catalyst (83 ppm Cobalt as Cobalt-stearate, CAS: 1002-88-6) was added as a melt to the melted polymer via side addition pump and the reaction mixture were subsequently further extruded, before the polymer melt flowed through the reactor discharge pump in a cooling bath with deionized water. The process conditions used during the experiment are described below:

Extruder type: (Leistritz Micro 27 36 D), co-rotating, extruder screw diameter 27 mm, screw length to diameter ratio (L:D) ratio is 36:1

Operation conditions: T0 cooling water temperature/T1 240° C./T2 258° C./T3 262/T4-T5 268° C./T6-T8 273° C./T9 269° C.

No vacuum level in degassing area

Polymer flow rate 8 kg/h

Type of granules: cylindrical, length 3 mm and diameter 2 mm

Example D11. Preforms and Bottles

Samples of copolyester-ethers prepared in Example D4 were dried and blended with the polyester base resin compositions prepared ion above Example D10 or resin 2300K so that a final polyether concentration of 1 wt.-% was obtained. The blend was injection molded into preforms. The preforms were stretch blow molded into 500 mL, 28 g bottles, according to the previously described procedure. The bottle compositions are indicated in the below Table D9. The prepared bottles were tested for delamination according to the third delamination test:

TABLE D9

| | | Copolyester-ether (COPE) | | |
|---|---|---|---|---|
| Sample | Polyester | Terathane ® Polyetherglycol [g/mol] | wt.-%-ratio Terathane ® Polyetherglycol/ PTA-EG | Delamination (cm) |
| 50 | 7090 | 1400 | 45/55 | 4.21 |
| 51 | T94N | 1400 | 45/55 | 4.79 |
| 52 | BRC | 1400 | 45/55 | 4.04 |
| 53 | 1101 | 1400 | 45/55 | 4.63 |
| 54 | 2300K | 1400 | 45/55 | 2.54 |

The above table demonstrates that bottles prepared according to the invention but using different polyester base resins do provide similar performance.

This application claims the benefit of priority of EP 13199102.8, filed 20 Dec. 2013, EP 13199112.7, filed 20 Dec. 2013, EP 13199125.9, filed 20 Dec. 2013, EP 13199131.7, filed 20 Dec. 2013, U.S. Ser. No. 62/069,236, filed 27 Oct. 2014, U.S. Ser. No. 62/069,239, filed 27 Oct. 2014, U.S. Ser. No. 62/069,252, filed 27 Oct. 2014, and U.S. Ser. No. 62/069,258, filed 27 Oct. 2014, each of which is incorporated herein by reference in its entirety.

While the invention has been described in conjunction with specific embodiments thereof, it is understood that many alternatives, modifications, and variations will be apparent to those skilled in the art in light of the foregoing description. Accordingly, it is intended to embrace all such alternatives, modifications, and variations as fall within the spirit and scope of the appended embodiments.

Embodiments

First Aspect

1. A composition for preparing an article, preform or container comprising:
   a) 80-98.5 parts by weight of a base polyester;
   b) 0.5-20 parts by weight of a copolyester-ether, wherein the copolyester-ether comprises one or more polyester segments and one or more polyether segments, wherein the one or more polyether segments are present in an amount of about 5 to about 95 wt.-% of the copolyester-ether;
   c) a transition metal-based oxidation catalyst; and
   d) a monomeric, oligomeric or polymeric hindered amine light stabilizer (HALS) in an amount of 15-10,000 ppm, on basis of the weight of the stabilizer in the total composition, wherein the HALS is represented by the formula (I) or a mixture of compounds of formula (I),

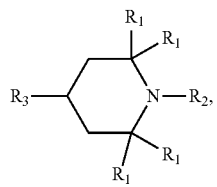

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS.

2. The composition of embodiment 1, wherein the polyether segment is a linear or branched poly ($C_2$-$C_6$-alkylene glycol) segment.

3. The composition of embodiment 1 or 2, wherein the polyether segment has a number-average molecular weight of about 200 to about 5000 g/mol, preferably about 600 to about 2500 g/mol.

4. The composition of any one of embodiments 1 to 3, wherein the polyether segments are present in the copolyester-ether in an amount of about 20 to about 40 wt.-%.

5. The composition of any one of embodiments 1 to 4, wherein the copolyester-ether comprises a polyethylene terephthalate (co)polyester segment.

6. The composition of any one of embodiments 1 to 5, wherein the HALS is a monomeric HALS, preferably having a molecular weight of 400 g/mol or above.

7. The composition of any one of embodiments 1 to 5, wherein the HALS is an oligomeric or polymeric HALS.

8. The composition of embodiment 7, wherein the HALS is an oligomeric or polymeric HALS comprising one or more moieties of the formula (I),

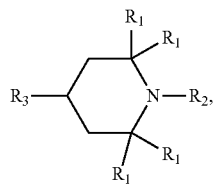

wherein each $R_1$ independently represents $C_1$-$C_4$ alkyl, $R_2$ represents H or $C_1$-$C_4$ alkyl, and $R_3$ represents a further part of the oligomeric or polymeric HALS.

9. The composition of any one of embodiments 1 to 8, wherein the HALS is present in an amount of about 20 to about 2500 ppm.

10. The composition of any one of embodiments 1 to 9, wherein transition metal-based oxidation catalyst is a cobalt compound.

11. The composition of any one of embodiments 1 to 10, wherein the copolyester-ether and/or the polyester is produced using a titanium-based polycondensation catalyst.

12. The composition of embodiment 11, wherein the weight ratio of titanium metal to HALS is 1:2 to 1:500.

13. The composition of any one of embodiments 1 to 12, wherein the transition metal-based oxidation catalyst is present in an amount of from about 15 to about 400 ppm based on the weight of the transition metal in the total composition 14. The composition of any one of embodiments 1 to 13, wherein the weight ratio of the one or more polyether segments to the total amount of base polyester and polyester segments in the composition is from about 0.2 to about 10 wt. %.

15. A masterbatch for use in preparing an article, preform or container comprising:
a) copolyester-ether,
wherein the copolyester-ether comprises one or more polyester segments and one or more polyether segments, wherein the one or more polyether segments are present in an amount of about 5 to about 95 wt.-% of the copolyester-ether; and
b) a monomeric, oligomeric or polymeric hindered amine light stabilizer (HALS) in an amount of 100-30,000 ppm, on basis of the weight of the stabilizer in the total composition, wherein the HALS is represented by the formula (I) or a mixture of compounds of formula (I),

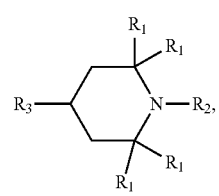

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS.

16. The masterbatch of embodiment 15, wherein the polyether segment is a linear or branched poly ($C_2$-$C_6$-alkylene glycol) segment.

17. The masterbatch of embodiment 15 or 16, wherein the polyether segment has a number-average molecular weight from 200 to about 5000 g/mol, preferably about 600 to about 2500 g/mol.

18. The masterbatch of any one of embodiments 15 to 16, wherein the polyether segments are present in the copolyester-ether in an amount of about 20 to about 40 wt.-%.

19. The masterbatch of any one of embodiments 15 to 18, wherein the copolyester-ether comprises a polyethylene terephthalate (co)polyester segment.

20. The masterbatch of any one of embodiments 15 to 19, wherein the HALS is a monomeric HALS, preferably having a molecular weight of 400 g/mol or above.

21. The masterbatch of any one of embodiments 15 to 19, wherein the HALS is an oligomeric or polymeric HALS.

22. The masterbatch of embodiment 21, wherein the HALS is an oligomeric or polymeric HALS comprising one or more moieties of the formula (I),

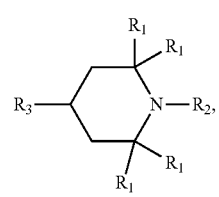

wherein each $R_1$ independently represents $C_1$-$C_4$ alkyl, $R_2$ represents H or $C_1$-$C_4$ alkyl, and $R_3$ represents a further part of the oligomeric or polymeric HALS.

23. The masterbatch of any one of embodiments 15 to 22, wherein the HALS is present in an amount of about 250 to about 10,000 ppm.

24. The masterbatch of any one of embodiments 15 to 23, wherein the copolyester is prepared using a titanium-based polycondensation catalyst.

25. The masterbatch of any one of embodiments 15 to 23, further comprising a titanium compound.

26. The masterbatch of embodiment 24 or 25, wherein weight ratio of titanium metal to HALS is 1:2 to 1:500.

27. The masterbatch or composition of any one of embodiments 1 to 26, wherein the weight ratio of the transition metal-based oxidation catalyst to the HALS is 100:1 to 1:50.

28. An article, preform or container prepared from a composition of any one of embodiments 1 to 27.

29. A method of preparing a masterbatch for use in preparing an article, preform or container comprising mixing a copolyester-ether, wherein the copolyester-ether comprises one or more polyester segments and one or more polyether segments, wherein the one or more polyether segments are present in an amount of about 5 to about 95 wt.-% in the copolyester-ether; with a monomeric, oligomeric or polymeric hindered amine light stabilizer (HALS) in an amount of 100-30,000 ppm, on basis of the weight of the stabilizer in the total composition, wherein the HALS is represented by the formula (I) or a mixture of compounds of formula (I),

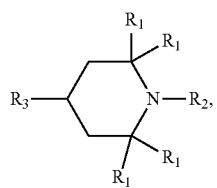

(I)

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS.

30. A method of preparing a composition for use in preparing an article, preform or container comprising mixing 80-98.5 parts by weight of a base polyester with:
a) 0.5-20 parts by weight of a copolyester-ether,
  wherein the copolyester-ether comprises one or more polyester segments and one or more polyether segments, wherein the one or more polyether segments are present in an amount of about 5 to about 95 wt.-% of the copolyester-ether;
b) a transition metal-based oxidation catalyst; and
c) a monomeric, oligomeric or polymeric hindered amine light stabilizer (HALS) in an amount of 15-10,000 ppm, on basis of the weight of the stabilizer in the total composition, wherein the HALS is represented by the formula (I) or a mixture of compounds of formula (I),

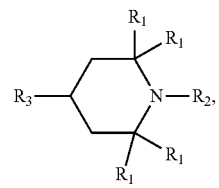

(I)

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS.

31. Use of a monomeric, oligomeric or polymeric hindered amine light stabilizer (HALS), wherein the HALS is represented by the formula (I) or a mixture of compounds of formula (I),

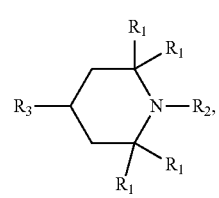

(I)

wherein each $R_1$ independently represents $C_1$-$C_4$ alkyl, $R_2$ represents H, $C_1$-$C_4$ alkyl, OH, O—$C_1$-$C_4$ alkyl, or a further part of an oligomeric or polymeric HALS, and $R_3$ represents a further part of a monomeric, oligomeric or polymeric HALS; for reducing the amount of decomposition products in an article, preform or container comprising: 80-98.5 parts by weight of a base polyester; 0.5-20 parts by weight of a copolyester-ether, wherein the copolyester-ether comprises one or more polyester segments and one or more polyether segments, wherein the one or more polyether segments are present in an amount of about 5 to about 95 wt.-% of the copolyester-ether; and a transition metal-based oxidation catalyst.

Second Aspect

1. A composition for preparing articles, preforms or containers comprising:
a) 80-99.5 parts by weight of a base polyester;
b) 0.5-20 parts by weight of a copolyester-ether, wherein the copolyester-ether comprises one or more polyester segments and one or more polyether segments;
c) a transition metal-based oxidation catalyst,
  c1) wherein the transition metal is selected from cobalt, manganese, copper, chromium, zinc, iron, and nickel, and
  c2) wherein the transition metal based oxidation catalyst is present in an amount of 10-500 ppm, on basis of the weight of the transition metal in the total composition; and
d) a titanium compound,
wherein the weight ratio of the transition metal-based oxidation catalyst to the titanium compound, on basis of the weight of the transition metal and the titanium, is from 50:1 to 1:1.

2. The composition of embodiment 1, wherein the polyether segment is a linear or branched poly ($C_2$-$C_6$-alkylene glycol) segment.
3. The composition of embodiment 1 or 2, wherein the polyether segment has a number-average molecular weight of from about 200 to about 5000 g/mol, preferably from about 600 to about 2500 g/mol.
4. The composition of any one of embodiments 1 to 3, wherein the amount of titanium in the total composition is less than the amount of the transition metal of the transition metal based oxidation catalyst in the total composition.
5. The composition of any one of embodiments 1 to 4, wherein the titanium compound is present in an amount of 5 to 20 ppm, on basis of the weight of titanium in the total composition, and wherein the transition metal based oxidation catalyst is present in an amount of 30 to 200 ppm, on basis of the weight of the transition metal in the total composition.
6. The composition of any one of embodiments 1 to 5, wherein the amount of titanium in the total composition is between 3 and 15 ppm.
7. The composition of any one of embodiments 1 to 6, wherein the titanium compound is a polycondensation and/or transesterification catalyst.
8. The composition of any one of embodiments 1 to 7, wherein transition metal-based oxidation catalyst is a cobalt compound.
9. The composition of any one of embodiments 1 to 8, wherein the copolyester-ether comprises a polyethylene terephthalate (co)polyester segment.
10. The composition of any one of embodiments 1 to 9, wherein the polyester is a polyethylene terephthalate (co)polyester.
11. A kit-of-parts for use in preparing articles, preforms or containers comprising two masterbatches which may optionally be in admixture:
a first masterbatch comprising:
a) a base polyester,
b) a transition metal-based oxidation catalyst, wherein the transition metal is selected from cobalt, manganese, copper, chromium, zinc, iron, and nickel, and
c) a titanium compound, wherein the titanium compound is present in an amount of about 5 to about 500 ppm, on basis of the weight of the titanium in the first masterbatch; and
a second masterbatch comprising:
d) a copolyester-ether; and optionally
e) one or more antioxidants.
12. The kit-of-parts of embodiment 11, wherein the kit-of-parts is packaged for storage.
13. The kit-of-parts of embodiment 11 or 12, wherein the transition metal based oxidation catalyst is present in an amount of 500-15000 ppm, on basis of the weight of the transition metal in first masterbatch.
14. The kit-of-parts of any one of embodiments 11 to 13, wherein the second masterbatch comprises an antioxidant selected from group consisting of hindered phenols, benzophenones, sulfur-based antioxidants, phosphites and hindered amine light stabilizer.
15. The kit-of-parts of any one of embodiments 11 to 14, wherein the weight ratio of the transition metal-based oxidation catalyst to the titanium compound, on basis of the weight of the transition metal and the titanium, is from 5:1 to 500:1 in the first masterbatch.
16. The kit-of-parts of any one of embodiments 11 to 15, wherein transition metal-based oxidation catalyst is a cobalt compound in the first masterbatch.
17. The kit-of-parts of any one of embodiments 11 to 16, wherein the second masterbatch comprises a titanium compound.
18. An article, preform or container prepared from a composition or kit-of-parts of any one of embodiments 1 to 17.
19. A method of preparing a composition for use in preparing articles, preforms or containers comprising mixing:
a) 80-99.5 parts by weight of a base polyester;
b) 0.5-20 parts by weight of a copolyester-ether, wherein the copolyester-ether comprises one or more polyester segments and one or more polyether segments;
c) a transition metal-based oxidation catalyst,
c1) wherein the transition metal is selected from cobalt, manganese, copper, chromium, zinc, iron, and nickel, and
c2) wherein the transition metal based oxidation catalyst is present in an amount of 10-500 ppm, on basis of the weight of the transition metal in the total composition; and
d) a titanium compound;
wherein the weight ratio of the transition metal-based oxidation catalyst to the titanium compound, on basis of the weight of the transition metal and the titanium, is from 50:1 to 1:1.
20. A method of preparing a kit-of-parts for use in preparing articles, preforms or containers comprising combining two masterbatches, the first masterbatch comprising:
a) a base polyester,
b) a transition metal-based oxidation catalyst, wherein the transition metal is selected from cobalt, manganese, copper, chromium, zinc, iron, and nickel, and
c) a titanium compound, wherein the titanium compound is present in an amount of about 5 to about 500 ppm, on basis of the weight of the titanium in the first masterbatch; and
the second masterbatch comprising:
d) a copolyester-ether; and optionally
e) one or more antioxidants.

Third Aspect

1. A composition for preparing articles, preforms or containers comprising:
a) 80-99.5 parts by weight of a base polyester;
b) 0.5-20 parts by weight of a copolyester-ether,
b1) wherein the copolyester-ether comprises one or more polyester segments and one or more polyether segments, and
b2) wherein the one or more polyether segments are present in the copolyester-ether in an amount of 5 to 45 wt.-%;
c) a transition metal-based oxidation catalyst,
c1) wherein the transition metal is selected from cobalt, manganese, copper, chromium, zinc, iron, and nickel, and
c2) wherein the transition metal based oxidation catalyst is present in an amount of 10-500 ppm, on basis of the weight of the transition metal in the total composition; and
d) a titanium compound.
2. The composition of embodiment 1, wherein the polyether segment is a linear or branched poly ($C_2$-$C_6$-alkylene glycol) segment.

3. The composition of embodiment 1 or 2, wherein the polyether segment has a number-average molecular weight of about 200 to about 5000 g/mol, preferably about 600 to 2500 g/mol.
4. The composition of any one of embodiments 1 to 3, wherein the polyether segments are present in the copolyester-ether in an amount of 10 to 40 wt.-%.
5. The composition of embodiment 4, wherein polyether segments are present in the copolyester-ether in an amount of 20 to 35 wt.-%.
6. The composition of any one of embodiments 1 to 5, wherein the copolyester-ether comprises a polyethylene terephthalate (co)polyester segment.
7. The composition of any one of embodiments 1 to 6, wherein the amount of titanium in the total composition is less than the amount of the transition metal of the transition metal based oxidation catalyst in the total composition.
8. The composition of any one of embodiments 1 to 7, wherein the titanium compound is present in an amount of 5 to 20 ppm, on basis of the weight of titanium in the total composition, and wherein the transition metal based oxidation catalyst is present in an amount of 30 to 200 ppm, on basis of the weight of the transition metal in the total composition.
9. The composition of any one of embodiments 1 to 8, wherein the titanium compound is a polycondensation and/or transesterification catalyst.
10. The composition of any one of embodiments 1 to 9, wherein transition metal-based oxidation catalyst is a cobalt compound.
11. The composition of any one of embodiments 1 to 10, wherein the polyester is a polyethylene terephthalate (co)polyester.
12. A kit-of-parts for use in preparing articles, preforms or containers comprising two masterbatches which may optionally be in admixture:
the first masterbatch comprising:
a) a base polyester,
b) a transition metal-based oxidation catalyst, wherein the transition metal is selected from cobalt, manganese, copper, chromium, zinc, iron, and nickel, and wherein the transition metal based oxidation catalyst is present in an amount of 500-15000 ppm, on basis of the weight of the transition metal in first masterbatch,
c) a titanium compound; and
the second masterbatch comprising:
d) a copolyester-ether,
d1) wherein the copolyester-ether comprises one or more polyester segments and one or more polyether segments, wherein the one or more polyether segments are present in an amount of 5 and 45 wt.-% in the copolyester-ether; and optionally
e) one or more antioxidants.
13. The kit-of-parts of embodiment 12, wherein the kit-of-parts is packaged for storage.
14. The kit-of-parts of embodiment 12 or 13, wherein the titanium compound is present in an amount of about 5 to about 500 ppm, on basis of the weight of the titanium in the first masterbatch.
15. The kit-of-parts of any one of embodiments 12 to 14, wherein the transition metal based oxidation catalyst is present in an amount of 1000-10000 ppm, on basis of the weight of the transition metal in first masterbatch.
16. The kit-of-parts of any one of embodiments 12 to 15, wherein the second masterbatch comprises an antioxidant selected from group consisting of hindered phenols, benzophenones, sulfur-based antioxidants, phosphites and hindered amine light stabilizer.
17. The kit-of-parts of any one of embodiments 12 to 16, wherein the weight ratio of the transition metal-based oxidation catalyst to the titanium compound, on basis of the weight of the transition metal and the titanium, is from 5:1 to 500:1 in the first masterbatch.
18. The kit-of-parts of any one of embodiments 12 to 17, wherein transition metal-based oxidation catalyst is a cobalt compound in the first masterbatch.
19. The kit-of-parts of any one of embodiments 12 to 18, wherein the second masterbatch comprises a titanium compound.
20. An article, preform or container prepared from a composition or kit-of-parts of any one of embodiments 1 to 19.
21. A method of preparing a composition for use in preparing articles, preforms or containers comprising mixing:
a) 80-99.5 parts by weight of a base polyester;
b) 0.5-20 parts by weight of a copolyester-ether,
b1) wherein the copolyester-ether comprises one or more polyester segments and one or more polyether segments, and
b2) wherein the one or more polyether segments are present in the copolyester-ether in an amount of 5 to 45 wt.-%;
c) a transition metal-based oxidation catalyst,
c1) wherein the transition metal is selected from cobalt, manganese, copper, chromium, zinc, iron, and nickel, and
c2) wherein the transition metal based oxidation catalyst is present in an amount of 10-500 ppm, on basis of the weight of the transition metal in the total composition; and
d) a titanium compound.
22. A method of preparing a kit-of-parts for use in preparing articles, preforms or containers comprising combining two masterbatches,
the first masterbatch comprising:
a) a base polyester,
b) a transition metal-based oxidation catalyst, wherein the transition metal is selected from cobalt, manganese, copper, chromium, zinc, iron, and nickel, and wherein the transition metal based oxidation catalyst is present in an amount of 500-15000 ppm, on basis of the weight of the transition metal in first masterbatch,
c) a titanium compound; and
the second masterbatch comprising:
d) a copolyester-ether,
d1) wherein the copolyester-ether comprises one or more polyester segments and one or more polyether segments, and
d2) wherein the one or more polyether segments are present in an amount of 5 and 45 wt.-% in the copolyester-ether; and optionally
e) one or more antioxidants.

Fourth Aspect

1. A composition for preparing articles, preforms or containers comprising:
a) 80-99.5 parts by weight of a base polyester;
b) 0.5-20 parts by weight of a copolyester-ether,
wherein the copolyester-ether comprises one or more polyester segments and one or more polyether segments, wherein the one or more polyether segments are present in an amount of about 5 to about 45 wt.-% of the copolyester-ether; and
c) a transition metal-based oxidation catalyst;
wherein the melting point difference, determined according to ASTM D 3418-97, between the base polyester and the copolyester-ether is less than 15° C.

2. The composition of embodiment 1, wherein the polyether segment is a linear or branched poly ($C_2$-$C_6$-alkylene glycol) segment.

3. The composition of embodiment 1 or 2, wherein the polyether segment has a number-average molecular weight from about 200 to about 5000 g/mol, preferably from about 600 to about 2500 g/mol.

4. The composition of any one of embodiments 1 to 3, wherein the polyether segments are present in the copolyester-ether in an amount of about 20 to about 35 wt.-%.

5. The composition of any one of embodiments 1 to 4, wherein the copolyester-ether comprises a polyethylene terephthalate (co)polyester segment.

6. The composition of any one of embodiments 1 to 5, wherein the base polyester is polyethylene terephthalate or a copolymer thereof and has a melting point, determined according to ASTM D 3418-97, of about 240 to about 250° C.

7. The composition of any one of embodiments 1 to 6, wherein the melting point difference, determined according to ASTM D 3418-97, between the base polyester and the copolyester-ether is less than about 8° C.

8. The composition of any one of embodiments 1 to 7, wherein transition metal-based oxidation catalyst is a cobalt compound.

9. The composition of any one of embodiments 1 to 8, wherein the transition metal-based oxidation catalyst is present in an amount of from about 10 to about 500 ppm based on the weight of the transition metal in the total composition.

10. The composition of any one of embodiments 1 to 9, wherein the weight ratio of the one or more polyether segments to the total amount of base polyester and polyester segments in the composition is from about 0.2 to about 10 wt. %.

11. An article, preform or container comprising or prepared from a composition according to any one of embodiments 1 to 10.

12. A masterbatch for use in preparing articles, preforms or containers comprising:
a) a copolyester-ether,
a1) wherein the copolyester-ether comprises one or more polyethylene terephthalate (co)polyester segments and one or more linear or branched poly ($C_2$-$C_6$-alkylene glycol) segments, and
a2) wherein the one or more polyether segments are present in an amount of about 5 to about 45 wt.-% in the copolyester-ether, and
a3) wherein the melting point, determined according to ASTM D 3418-97, of the copolyester-ether is from about 225° C. to about 250° C.; and
b) 20-5000 ppm, on basis of the weight of the one or more linear or branched poly ($C_2$-$C_6$-alkylene glycol) segments, of one or more antioxidants selected from group consisting of hindered phenols, benzophenones, sulfur-based antioxidants, phosphites and hindered amine light stabilizers.

13. The masterbatch of embodiment 12, wherein the copolyester-ether comprises one or more poly (butylene glycol) or poly (propylene glycol) segments, wherein the one or more poly (butylene glycol) or poly (propylene glycol) segments are present in an amount of about 20 to 35 wt.-% in the copolyester-ether, and wherein the melting point, determined according to ASTM D 3418-97, of the copolyester-ether is from about 225° C. to about 250° C.

14. The masterbatch of embodiments 12 or 13, wherein the poly ($C_2$-$C_6$-alkylene glycol) segments have a number-average molecular weight from about 600 to about 2500 g/mol, preferably from about 600 to about 1800 g/mol.

15. A copolyester-ether comprising one or more polyethylene terephthalate (co)polymer segments and one or poly (butylene glycol) or poly(propylene glycol) segments, wherein the one or more poly(butylene glycol) or poly (propylene glycol) segments are present in an amount of about 20 to about 35 wt.-% in the copolyester-ether, and having a melting point, determined according to ASTM D 3418-97, of from about 225° C. to about 250° C.

16. The copolyester-ether of embodiment 15, wherein the poly (butylene glycol) or poly (propylene glycol) segments have a number average molecular weight of about 600 to about 1800 g/mol.

17. A method of preparing an article, preform or container, wherein 80-99.5 parts by weight of a base polyester are blended with:
a) 0.5-20 parts by weight of a copolyester-ether,
wherein the copolyester-ether comprises one or more polyester segments and one or more polyether segments, wherein the one or more polyether segments are present in an amount of about 5 to about 45 wt.-% of the copolyester-ether, and
b) a transition metal-based oxidation catalyst;
wherein the melting point difference, determined according to ASTM D 3418-97, between the base polyester and the copolyester-ether is less than 15° C.

18. Use of a copolyester-ether for preparing an article, preform or container, wherein the copolyester-ether comprises one or more polyester segments and one or more polyether segments, wherein the one or more polyether segments are present in the copolyester-ether in an amount from about 5 to about 45 wt.-%, and wherein the melting point of the copolyester-ether, determined according to ASTM D 3418-97, is from about 225° C. to about 250° C.; for preparing an article, preform or container.

19. Use of a copolyester-ether, wherein the copolyester-ether comprises one or more polyester segments and one or more polyether segments, wherein the one or more polyether segments are present in the copolyester-ether in an amount from about 5 to about 45 wt.-%, and wherein the melting point of the copolyester-ether, determined according to ASTM D 3418-97, is from about 225° C. to about 250° C.; for preparing a kit-of-parts comprising said copolyester-ether and physical or electronic instructions or advise to use said copolyester-ether for preparing an article, preform or container.

What is claimed is:

1. A composition for preparing an article, preform or container comprising:
a) 80-98.5 parts by weight of a base polyester;
b) 0.5-20 parts by weight of a copolyester-ether, wherein the copolyester-ether comprises one or more polyester segments and one or more polyether segments, wherein the one or more polyether segments are present in an amount of about 5 to about 95 wt.-% of the copolyester-ether;
c) a transition metal-based oxidation catalyst; and
d) a monomeric, oligomeric or polymeric hindered amine light stabilizer (HALS) in an amount of 15-10,000 ppm, on basis of the weight of the stabilizer in the total composition, wherein the HALS is represented by the formula (I) or a mixture of compounds of formula (I),

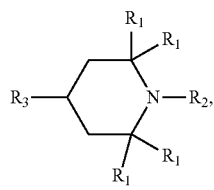

(I)

wherein each R1 independently represents C1-C4 alkyl, R2 represents H, C1-C4 alkyl, OH, O—C1-C4 alkyl, or a further part of an oligomeric or polymeric HALS, and R3 represents a further part of a monomeric, oligomeric or polymeric HALS,
wherein addition of the HALS to the composition reduces degradation products without reducing oxygen barrier properties.

2. The composition of claim 1, wherein the polyether segment is a linear or branched poly (C2-C6-alkylene glycol) segment.

3. The composition of claim 1 wherein the polyether segment has a number-average molecular weight of about 200 to about 5000 g/mol.

4. The composition of claim 1, wherein the polyether segments are present in the copolyester-ether in an amount of about 15 to about 45 wt. %.

5. The composition of claim 1, wherein the copolyester-ether comprises a polyethylene terephthalate (co)polyester segment.

6. The composition of claim 1, wherein the HALS is a monomeric HALS having a molecular weight of 400 g/mol or above.

7. The composition of claim 1, wherein the HALS is an oligomeric or polymeric HALS.

8. The composition of claim 7, wherein the HALS is an oligomeric or polymeric HALS comprising one or more moieties of the formula (I),

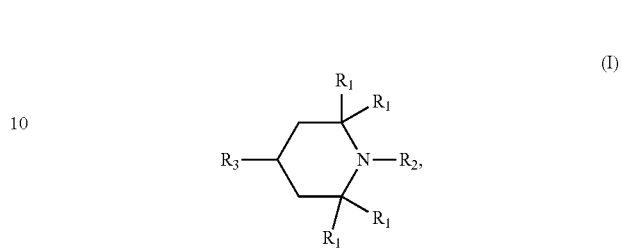

wherein each R1 independently represents C1-C4 alkyl, R2 represents H or C1-C4 alkyl, and R3 represents a further part of the oligomeric or polymeric HALS.

9. The composition of claim 1, wherein the HALS is present in an amount of about 20 to about 2500 ppm.

10. The composition of claim 1, wherein transition metal-based oxidation catalyst is a cobalt compound.

11. The composition of claim 1, wherein the transition metal-based oxidation catalyst is present in an amount of from about 15 to about 400 ppm based on the weight of the transition metal in the total composition.

12. The composition of claim 1, wherein the weight ratio of the one or more polyether segments to the total amount of base polyester and polyester segments in the composition is from about 0.2 to about 10 wt. %.

13. A method of preparing the composition of claim 1, comprising mixing the base polyester with:
   a) 0.5-20 parts by weight of the copolyester-ether;
   b) the transition metal-based oxidation catalyst; and
   c) the HALS in an amount of 15-10,000 ppm, on basis of the weight of the stabilizer in the total composition.

* * * * *